Dec. 28, 1965    H. BENMUSSA ETAL    3,226,486
SELECTION SYSTEM

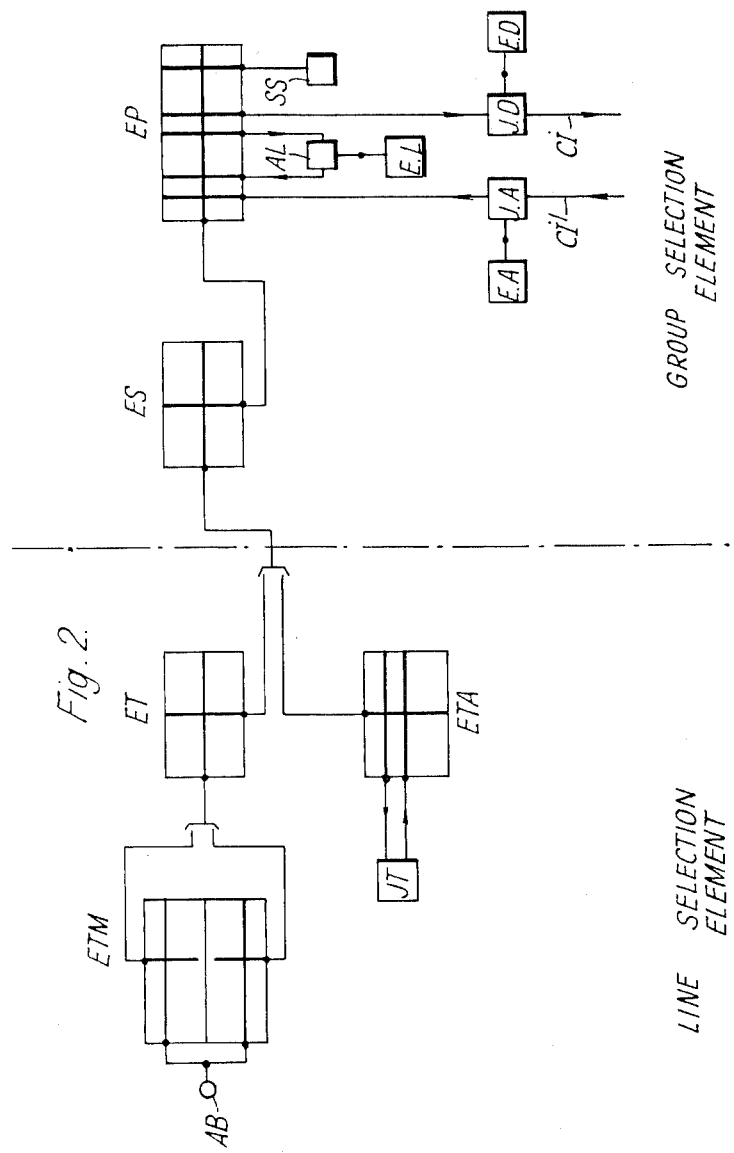

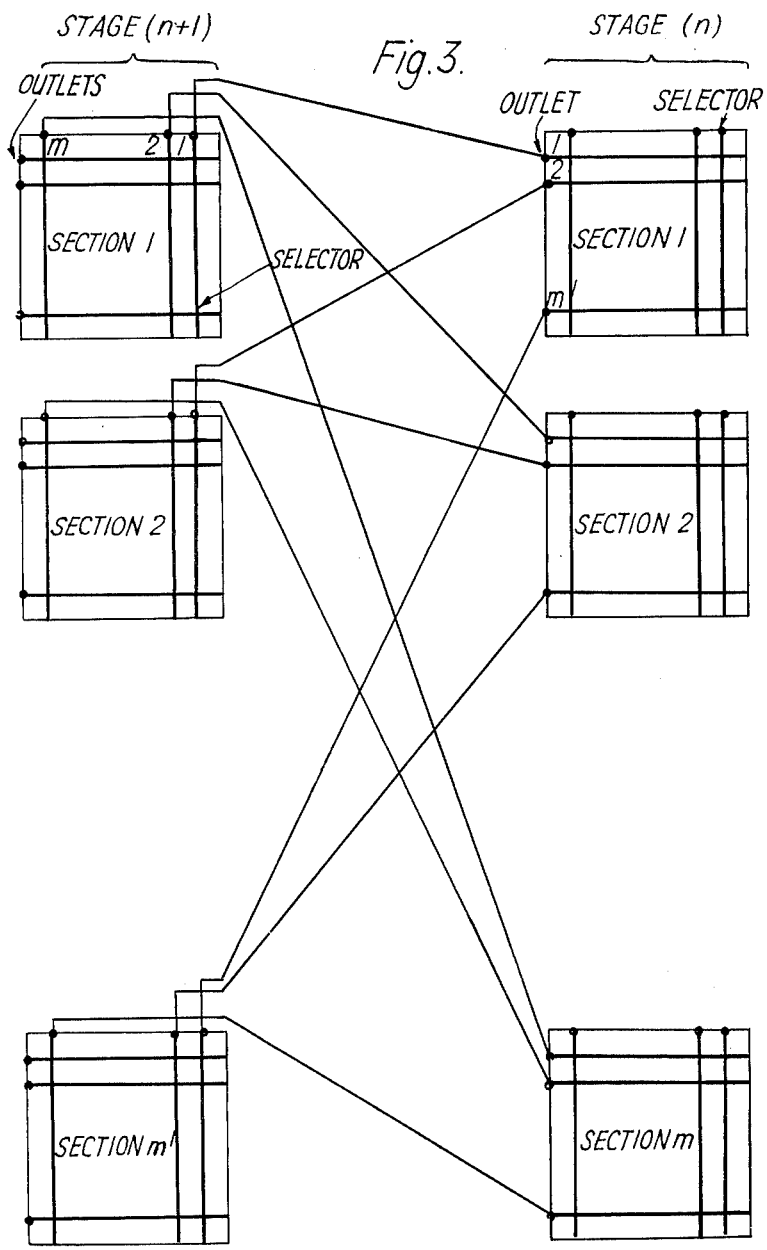

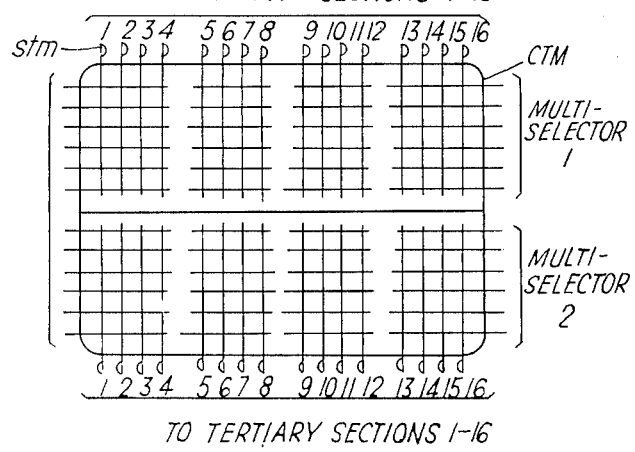

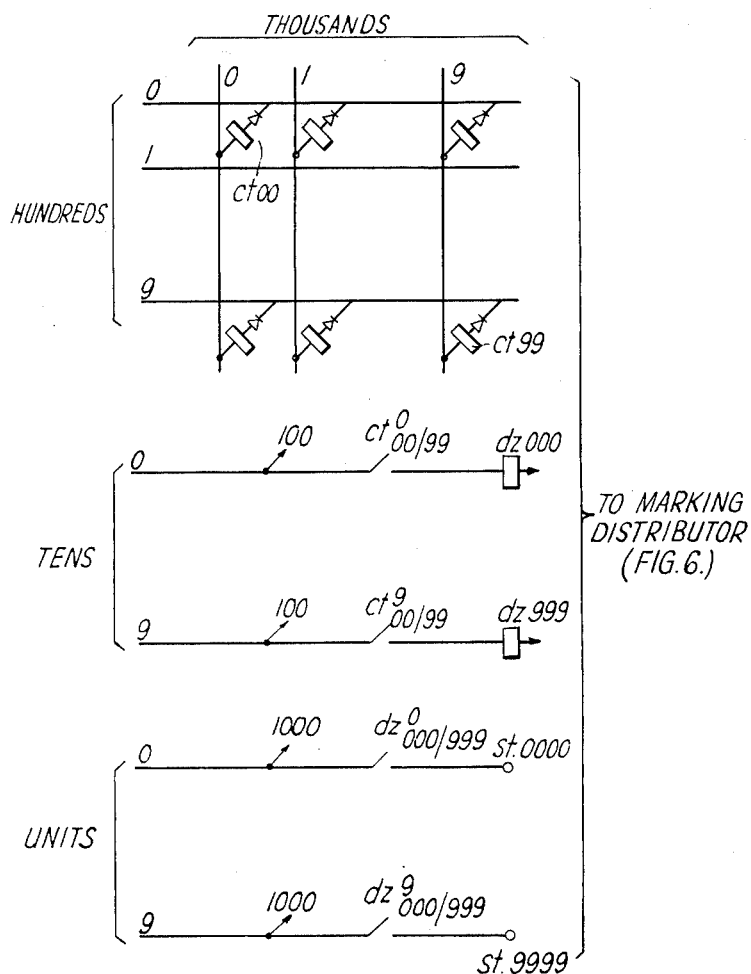

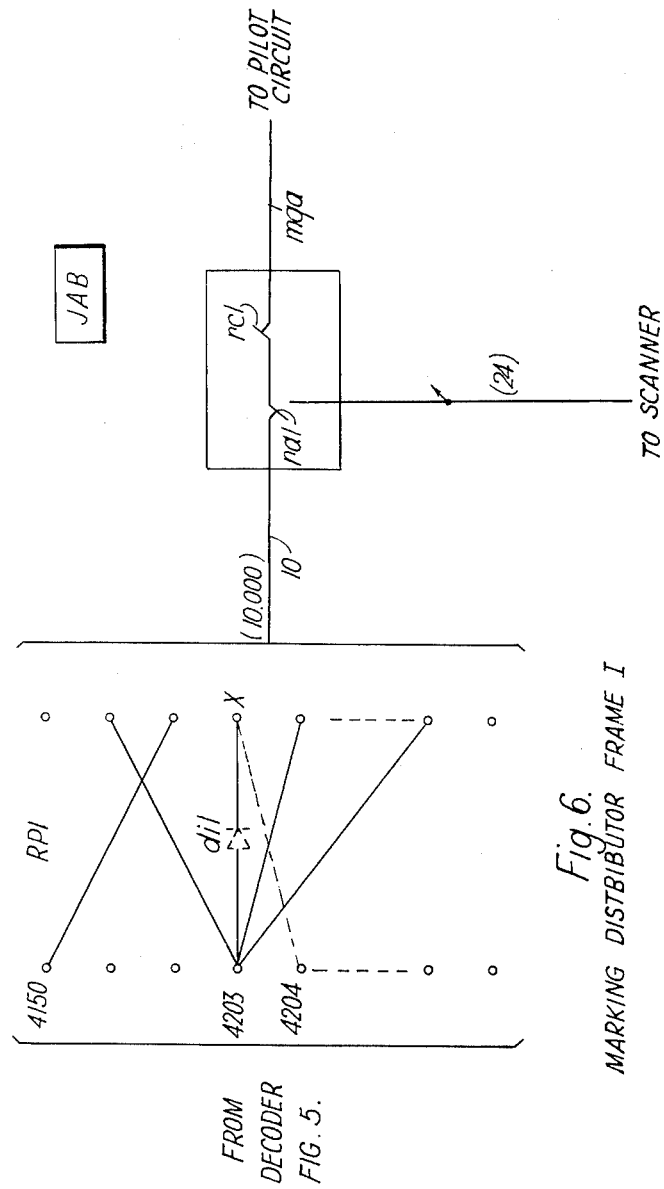

Filed March 5, 1962    19 Sheets-Sheet 12

Inventor
H. Benmussa
P.R.L. Marty
S. Kobus
By Phillip A. Weiss
Attorney

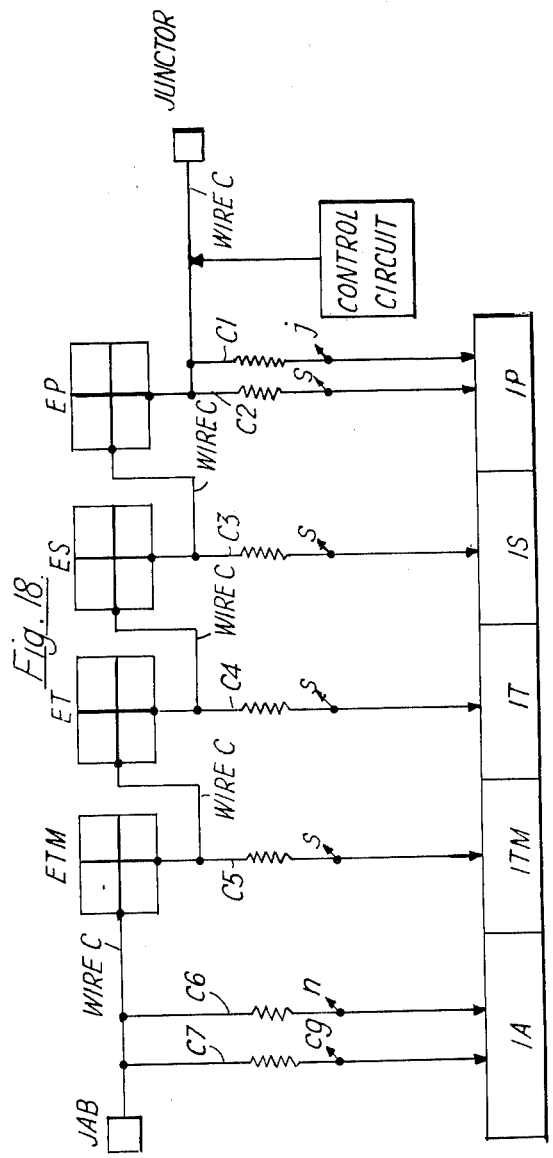

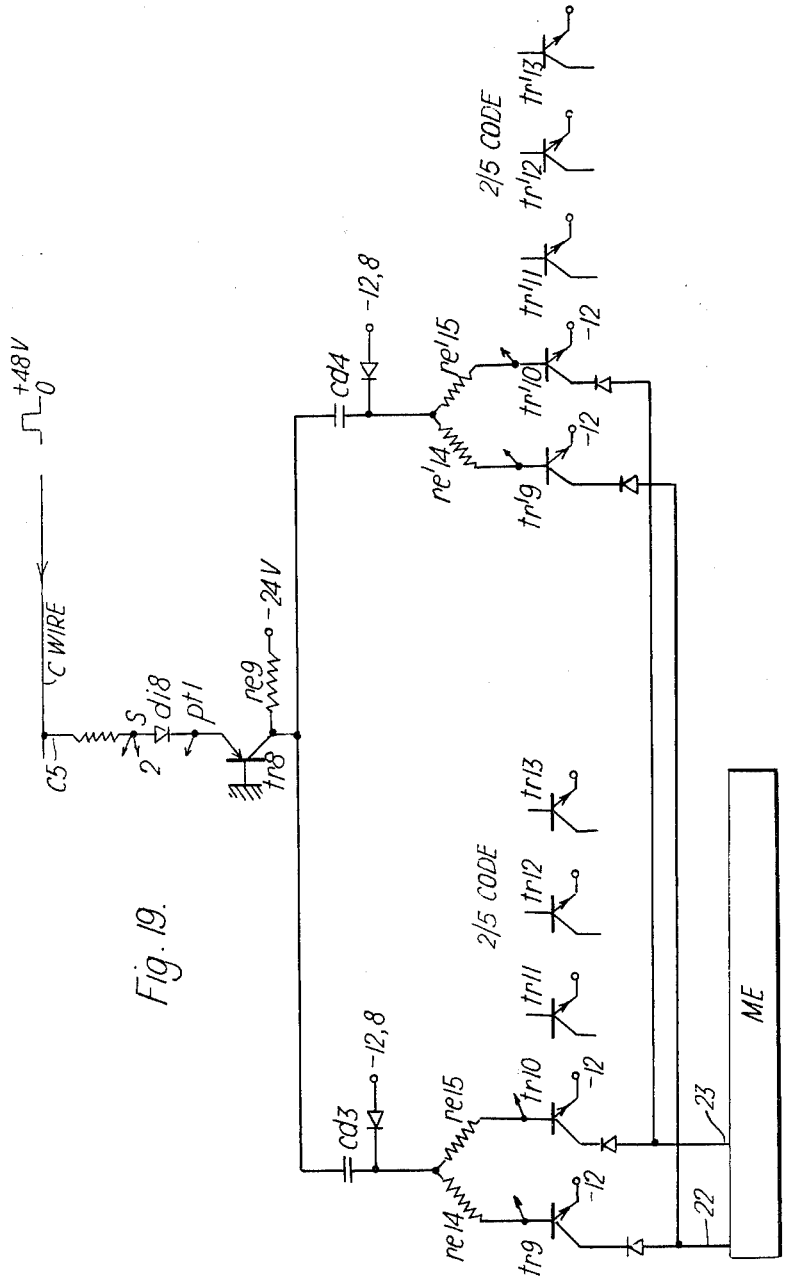

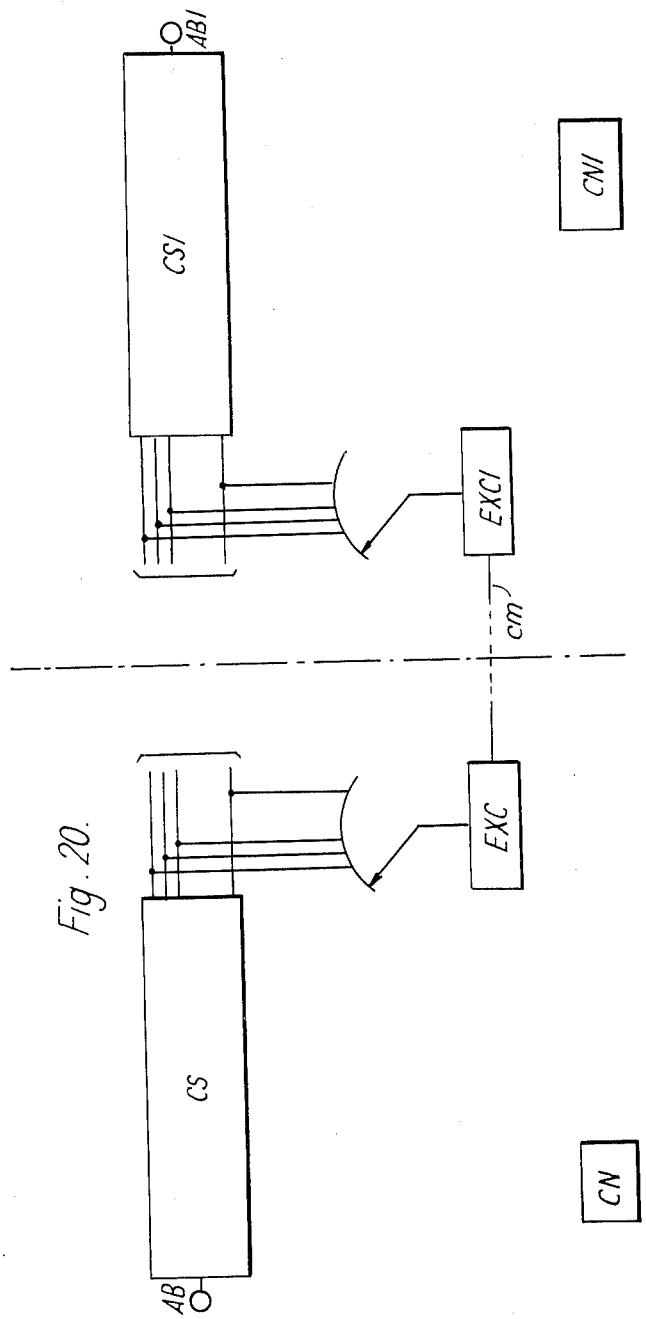

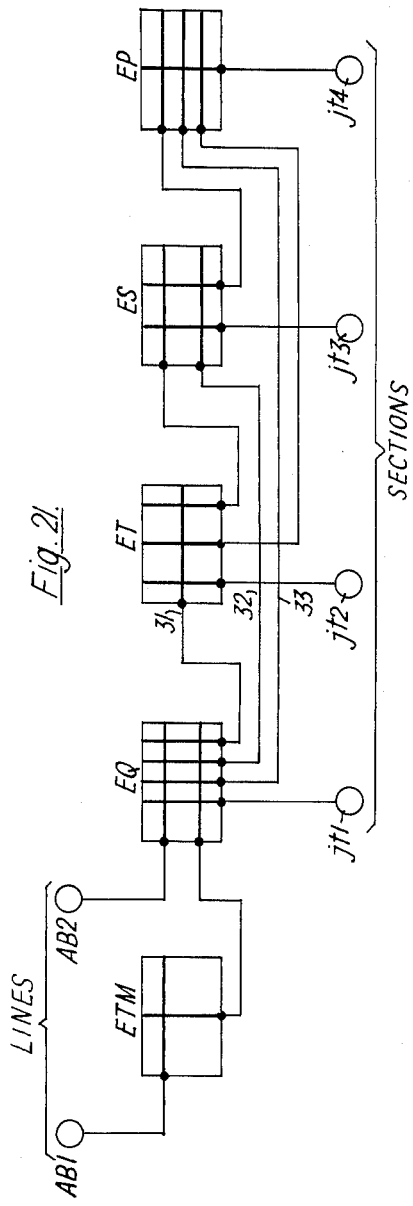

United States Patent Office 3,226,486
Patented Dec. 28, 1965

3,226,486
SELECTION SYSTEM
Henri Benmussa, Pierre Rene Louis Marty, and Stanislas Kobus, Paris, France, assignors to International Standard Electric Corporation, New York, N.Y., a corporation of Delaware
Filed Mar. 5, 1962, Ser. No. 177,551
Claims priority, application France, Mar. 3, 1961, 854,440, Patent 1,290,332
11 Claims. (Cl. 179—18)

This invention relates to a switching system for selecting circuits or electrical equipment and in particular to electronically controlled selector systems for automatic telephone exchanges.

Numerous systems already exist, which use in their switching stages electro-magnetic switching units made up of rotary selectors, relays, or crossbar switches. The checking and control are generally achieved by means of relays. Such systems operate in satisfactory manner, but are not fast enough. This low speed in operating is a disadvantage which becomes very obvious when a call has to transit through several exchanges. One means for increasing the operating speed is to substitute, for the said switching units and relays, electronic apparatus using components of practically instantaneous operation such as, diodes and transistors. A drawback then is that the number of components needed in a connection network makes the cost price of a telephone-exchange installation rather prohibitive; furthermore, a contact which is obtained by such means seldom presents the good qualities of an electro-mechanical switching unit contact which has practically no impedance when closed and infinite impedance when opened.

Therefore, it is an object of the present invention to provide a switching system which has all of the advantages found in the above-mentioned systems but does not present any of the drawbacks.

A related object is to provide a switching system utilizing electro-magnetic switching units controlled by electronic markers.

Another object is to provide a fast operating selector system comprising a plurality of selector stages controlled by a centralized marker system which causes each stage to switch through simultaneously.

A further object is to provide an electronically controlled selector system utilizing fast operating electromagnetic switching units with reduced current consumption.

Yet a further object is to provide a useful economical reliable and flexible switching system.

A feature of the present invention is a selection system for circuits or electric equipment, including a connection network that links two circuits or equipment; a piloting network that determines the shortest available routing path between those two circuits; and means for marking, at each end of the piloting network, the circuits to be linked. Signals are sent from the marked circuits, at each end, toward the marked circuits at the other end through all the available paths. The path divisions are subsequently progressively blocked without hindering the passage of the signals until there remains only one through path in each stage. The identity of the chosen path is then communicated to the connection network to initiate the simultaneous switch-through of all stages of the network.

According to another feature of the invention, the switch-through path is selected by blocking a part of the path in every stage; then a part of the remaining unblocked paths is blocked and so on until only one path remains. Means are provided so that if the signal is no longer received at the other end of the piloting network, the paths previously blocked are restored to service.

According to another feature of the invention, the selectors in each stage are divided into "group of selectors" so that there is only one link or path for connecting two groups of selectors belonging to two consecutive selection stages. There is associated with each group of selectors a gate which passes or stops the piloting signals. When in every stage all the gates are blocked except one, a succession of paths defining a through path between two marked circuits is determined without any ambiguity. In general, the selectors are divided into "sections" in each stage. A section is made up of a set of selectors giving access to the same outlets. If there is only one link between two sections belonging to two consecutive stages, the group of selectors described in the above aforementioned paragraph is a section; if there are two or several links between the said sections, a group of selectors will only include a part of a section or a "sub-section."

According to another feature of the invention, the gate which is associated with each group of selectors is an amplifier. A scanner is provided for each selection stage which progressively blocks these amplifiers until only one remains operated. A scanner position indication is then recorded in a control circuit associated with the stage considered here.

According to another feature of the invention, when the scanner position indications are recorded in the corresponding control circuits, connection is effected in each stage by making use of three distinct information signals. One information signal is given by the control circuit of the stage considered here for choosing the multi-selector, and the other two information signals are given by the control circuit of the neighboring stages for choosing the input and output.

According to another feature of the invention, each multiselector electro-magnet is placed in the collector circuit of a power transistor. The transistor is saturated by applying a current of sufficient amplitude to the emitter circuit. Thus, the electro-magnet is exposed to a high voltage and operates in a very short time. The current of the electromagnet is limited by the current of the emitter.

According to another feature of the invention, there is placed in parallel with the electro-magnet an impedance such as a Zener diode which operates at constant voltage and varying current to absorb over-voltage which originates when the circuit is opened. Thus, eliminating current transients as soon as the control impulse of the electro-magnet ends. In addition, all contacts existing on the circuit of the electro-magnet have no transient current to cut, which reduces their wear and tear and cancels line noises.

According to another feature of the invention, the above described process in respect of electro-magnets is also applied to all the relays which are used for controlling the said electro-magnets, reducing the system's operating time.

According to another feature of the invention, so-called "magnets with memory" are used as multiselector connecting magnets. They are magnets which maintain magnetization by mere remanence, reducing the current consumption during the entire duration of the call.

When cascaded multiselectors or selection chains are employed for establishing a telephone call, the subscribers are as a rule arranged at one end of the chain by connecting them to the outlets of the last stage. The junctions, local or outgoing, are arranged at the other end of the chain by connecting them to the inlets of the first stage. A local call puts into use therefore two selection chains— one for connecting the calling subscriber to a local junction, and the other for connecting that same junction to the called party. An outgoing call necessitates only one chain for connecting a calling subscriber to an outgoing junction. In the same way, an incoming call necessitates only one chain to connect the incoming junction to the called party. Finally, for transit calls, specialized junctors are provided and are arranged in the same way as for the subscribers, or preferably, they are set out on the banks of an intermediary stage; such calls make use therefore of two chains.

According to another feature of the invention, when a subscriber effects a call, a line scanner starts scanning for the associated equipment. The signals are then connected to a piloting network through the scanner equipment of the calling subscriber.

According to another feature of the invention, the line scanner tests simultaneously all the subscribers having the same rank upon the banks of the terminal stage. The position of this scanner and the position of the terminal stage scanner will determine without any ambiguity an off-hook calling subscriber. Only one low capacity line scanner of need be used, thus reducing scanning time.

According to another feature of the invention, a so-called "subscriber's translator" receives from the register the whole or part of the dialed number, deduces the telephone number of the corresponding subscriber equipment and dispatches signals through the said equipment along the piloting network only if the called subscriber is free.

According to another feature of the invention, the subscriber's lines of a group (PBX) are distributed upon different sets of terminal selectors. By means of a piloting signal, all the lines of the group are marked in the event the corresponding telephone number is received. The selection of one line only is obtained since the scanner of the terminal stage chooses only one set of selectors.

According to another feature of the invention, a routing translator receives a whole or part of the dialed number from the register, deduces the number of one or several junctions liable to route the call, and establishes the continuity of the path divisions of the piloting network which correspond to the said junctions. This continuity may be established by means of relay contacts, by means of gates, by means of amplifiers or by any other means.

According to another feature of the invention, a grouping is made of the path divisions of the piloting network which corresponds to the inlets of same rank in the primary stage. The grouping is multiplied upon a single gate. A junction scanner progressively blocks these gates until there remains only one gate open. The position of the primary stage scanner and the position of the junction scanner determines without any ambiguity the chosen junction for putting the call through.

According to another feature of the invention, in order to control the connection in the terminal stage, the outlet rank is determined by consulting either the line scanner position in the case of a calling subscriber, or the translator of telephone directory number in the case of a called subscriber.

According to another feature of the invention, in order to control the connection in the primary stage, the outlet rank is determined by consulting the position of the junction scanner.

According to another feature of the invention, an identification wire is provided along the entire selection chain. An identifier is connected to this wire in every stage. A signal is transmitted to one end of the said wire which will order registered in the identifiers the information used for establishing the connection (sections, inlets, outlets).

According to another feature of the invention, the items of information registered in the identifiers are compared with those utilized for establishing the connection. If there is disagreement, release of the various seized units is caused by any appropriate means.

According to a variant, another feature of the invention resides in the fact that if the signal transmitted at one end of the identification wire gives no result in the identifier placed at the other end of this wire, it is deduced that there is a break of continuity in the connection network. Release of the various units in seized condition is caused by any appropriate means.

According to another feature of the invention, an identifier is connected onto the identification wire at the output of the terminal stage. The purpose of this identifier is to register information concerning the subscriber's category. This information is then transmitted to the register to enable the latter to take any necessary further action in connection with the call.

A local junction (feeder) is associated, rigidly with the two primary selectors—one placed at calling subscriber's side and the other at called subscriber's side. When the calling subscriber is already connected to a local junction, and a free through-path has to be found between the said junction and a subscriber called from the central exchange considered here, then the primary selector is known and the search for a through-path can be simplified.

According to another feature of the invention, in order to link the local junction already in seized condition with the calling subscriber on one hand and the called party on the other hand, an indication is made which identifies the rank of the primary selector associated with the called party side of the local junction. The logic circuit takes notice of these indications and responsive thereto orientates the junction scanner and the primary stage scanner onto the positions which in combination define the primary selector associated with the called party side of the local junction.

According to another feature of the invention, in order to drop the call, a search is first undertaken to find out the identity of the connecting electro-magnets used. The demagnetizing of these electro-magnets is accomplished by the same circuits used for their energizing, but by supplying them with reverse current.

According to another feature of the invention, in order to check the correct release of all the selectors in the chain, the logic circuit uses the data written in the identifiers by routing the different scanners onto the positions which they occupied at the moment the connection was being established. A signal is then transmitted onto one of the ends of the piloting network and is only received at the other end if the path which has been traced (or set) by the scanners is available. That is to say, means are provided to detect the point where the piloting signal can pass and to thus identify the selector which has not released.

According to another feature of the invention, two markers are associated with the connection network for reliability purposes, but in order to avoid doubling the piloting network, only one search for a through-path is effected at a given moment. Suitable means are provided to prevent one marker from choosing a group of selectors already designated by the other marker.

According to another feature of the invention, when a subscriber makes a call he is connected to a local junction and from there onto a register. In case he dials a number which corresponds to an outgoing circuit, a marking is made of the subscriber on one hand, and of the said circuit on the other hand at both ends of the piloting network. This prepares the establishment of a link between the subscriber and the circuit. The logic circuit takes notice of the identity of the selectors used in the first chain, orders the establishment of the connection through the second chain and the release of the first chain.

According to another feature of the invention, in order to establish a connection between an incoming junction and a called subscriber, the primary selector associated with this junction is identified. This identification orientates the junction scanner and primary stage scanner onto positions defining, in combination, the said selector. The search for an available or free routing path and the establishment of the connection is then made as in the case of a link between the local junction and the called party.

According to another feature of the invention, in order to effect a conjugated selection between two distant telephone exchanges, two switching units, one in each exchange, are used which will scan in synchronized manner, the circuits between the exchanges. A search is made in each exchange by means of signals transmitted along a piloting network to find out whether there exists at least one available routing path between the circuit designated by the scanner and the equipment placed at the other end of the chain. If there is a route available, means are provided to stop the two scanners on the circuit under consideration here so as to choose only one path in each exchange and to simultaneously connect all the selectors. If there is no route available the next circuits are scanned until a route is found.

According to another feature of the invention, some equipment (subscribers, local junctions, outgoing junctions) are placed on intermediary points of the selection chains. The link is made between two equipments by using either all or only part of the stages placed among the said intermediary points. Means are provided for always choosing the shortest path between two possible routing paths.

Other objects and features of the invention will become apparent and the invention will be best understood by referring to the accompanying specification taken in conjunction with the accompanying sheets of drawings comprising FIGS. 1 to 21 wherein:

FIG. 2 shows a mode of grouping the stages into group selection elements and line selection elements;

FIG. 3 shows a detailed circuit plan representing a mode of accomplishing the cabling between two successive selection stages;

FIG. 4 shows a circuit plan of the connecting of subscribers to a terminal selectors frame;

FIGS. 5 and 6 are schematic drawings of the telephone directory number translator;

Figure 16:
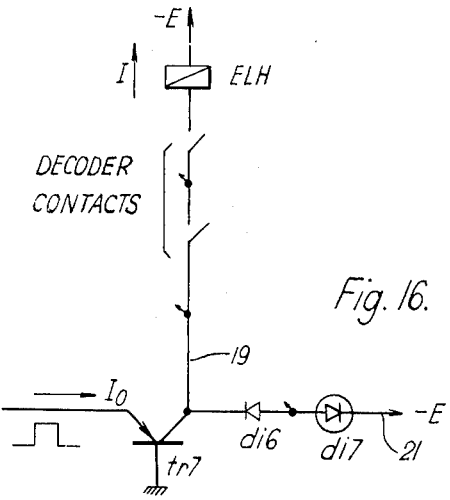
FIG. 16 shows an assembly which accomplishes the rapid control of the multiselector magnets and various relays.
Figure 17:
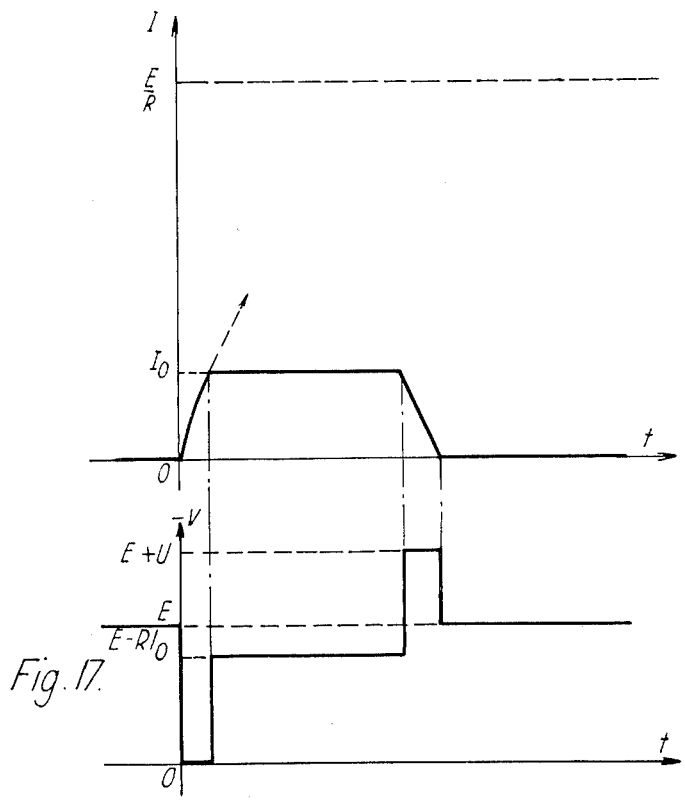

FIG. 17 contains graphs of the currents and voltages helpful in explaining the operation of the assembly in FIG. 16;

FIG. 18 is a simplified drawing of the identifiers;

FIG. 19 is a detailed drawing of an identifier which explains the reception and coding of the received information;

FIG. 20 is the operating diagram of the selection, conjugated between two distant telephone exchanges; and FIG. 21 is a diagram of the selection process utilizing a variable number of stages.

*General description.*—The operation of the system will now be explained by referring to FIGS. 1, 2, 3 and 8.

The relays are shown on the drawings by rectangles; the selection electro-magnets of the multiselector or horizontal electro-magnets are shown by rectangles crossed with a diagonal; and the connection electro-magnets or vertical electro-magnets are shown by a rectangle bearing a thick black stroke on its lateral side. A relay contact is designated on the drawing by the same reference sign as the relay which is followed by one of the FIGURES 1 to 9. A multiselector is represented by a rectangle containing a conductor square ruling or grid of by a rectangle containing a simple cross; the vertical conductors correspond to the selectors and the horizontal contacts to the outlets.

The subscribers AB (FIG. 1) can be linked to a junction $jt$ through a line circuit JAB and a certain number of selection stages. The line circuit equipment JAB includes a call relay $ra$ as well as a cutoff relay $rc$. In the example presented here it has been assumed that four selection stages exist: one primary stage EP; on secondary stage ES; one tertiary stage ET and one terminal stage ETM. This number is not limitative and can easily be modified according to necessity. In order to realize those different selection stages, use is made of crossbar multiselectors which are well known and of current use in automatic telephone. Crossbar switches have the advantage of operating rapidly and affording excellent contacts without introducing disturbing noises upon the neighboring circuits. Some junctions $jt$ are associated with feeders and are used in the case of local calls; others are associated with outgoing or incoming junctors and are used in the case of calls with circuits CI linked to distant exchanges. A local call uses the following equipment: a calling subscriber; a selection chain such as the one already described above; a feeder and a second selection chain similar to the preceeding one in order to link the said feeder to the called party. An outgoing call uses the following equipment: a calling subscriber; a selection chain; an outgoing junctor and a circuit CI. An incoming call takes the following equipment: a circuit CI; an incoming junctor; a selection chain, in order to finally connect to a called party. The equipment described above constitutes the "connection network" and are represented by a thick line so as to distinguish them from the other equipment.

The feeder performs different functions such as sending of the tones of ringing current, the feeding of subscribers' sets and the holding into seized condition of the different units during the call-conversation; the junctor associated with the circuit CI effects the exchanging with the distant telephone exchange of the selection and supervision signals necessary for putting the call through. The feeder as well as the junctor may be connected to a register which receives the dialed number, translates it and sends back the different digits necessary for the selection. The feeder, the junctor and the register are not part of the invention and will not be described.

The primary stage EP and the seconardy stage ES (FIG. 2) are as a rule provided for effecting the selection either of a group of subscribers inside the central exchange or of an outgoing circuit; they constitute the "group selection" element. The tertiary stage ET and the terminal stage ETM will effect the selection of a subscriber inside a group; they constitute the "line selection" element. In the multiselectors used, an outlet from a stage (horizontal) is always linked to a selector of the next stage (vertical). The selectors of the primary stage EP are linked, some to feeders AL, some to outgoing junctors JD, and others to incoming junctors JA. The feeders AL can be associated with local registers EL; while the outgoing registers ED and the incoming registers EA are respectively provided for the outgoing junctors JD and for the incoming junctors JA. Finally, some primary selectors give access to the special service SS. In the line selection element it can be seen that a subscriber AB is multiplied upon the banks of several groups of selectors. Lastly, an auxiliary tertiary stage ETA has been provided giving access to transit junctors JT. A transit call uses the following equipment: an incoming junctor JA; the section stages EP, ES, ETA; a transit junctor JT; three other selection stages ETA, ES, EP and an outgoing junctor JD.

The operation of the system shows great flexibility and is not in any way dependent upon the number of stages used. This number can be adapted to each individual need and is determined in general by the necessity for handling the traffic between the two ends of a selection chain without any appreciable internal blocking. Thus, for instance, if four stages are necessary to link a given feeder to a called subscriber, it is well understood that three or even two stages are enough to link a calling subscriber to an unoccupied feeder. In such a case, the calling side of the feeders will be connected to the selectors of the tertiary stage ET. During the hours of high traffic, these two stages may not be enough; therefore an additional stage is to be connected between the tertiary and terminal stages. Similar arrangements can be provided in the case of toll circuits. Some circuits of a group of trunks will appear upon the banks of the primary stage EP. Other circuits will be connected upon the banks of the secondary stages ES with a possibility of inserting a stage between EP and ES. Thus, the system can provide one, two or three selection stages for handling the traffic. Of course, the shortest path will be chosen in priority in order to link the two ends of a chain. Thus, in many cases, avoiding the use of three selection stages if two may be enough for the purpose.

In FIG. 3 a mode of achieving the wiring between a selection stage of the order $n$ and the next selection stage of the order $n+1$ is represented. The stage of the order $n$ comprises a certain amount of sections numbered from 1 to $m$. A section is defined by the entire set of selectors giving access to the same outlets. The section is represented in schematic manner by a grid of conductors—the vertical conductors correspond to the selectors and the horizontal conductors correspond to the outlets. The stage of the order $n+1$ comprises a certain amount of sections numbered from 1 to $m'$. The different outlets of a section in the stage of the order $n$ are linked to selectors of the stage of order $n+1$ belonging as far as possible to different sections. Thus, a selector of the stage $n$ may have access to the maximum number of outlets of the stage $n+1$. That is, the various selectors of a section in stage $n+1$ are linked to outlets of the stage $n$ belonging as far as possible to different sections. Thus, a given outlet of stage $n+1$ may have access to the maximum number of selectors in stage $n$.

In general, there is a link provided between any two sections belonging respectively to the primary stage and secondary stage in such manner that one primary selector has access to all the outlets of the secondary stage. These two stages constitute therefore a group selection element. Similarly, a link is provided between any two sections belonging respectively to the tertiary stage and to the terminal stage in such manner that these two last stages constitute a line selection element. As was already mentioned, an additional selection stage can be inserted either between the primary stage and the secondary stage, or between the tertiary stage and the terminal stage in such manner that there is total access between an inlet and any outlet of a selection element.

Figure 1A:
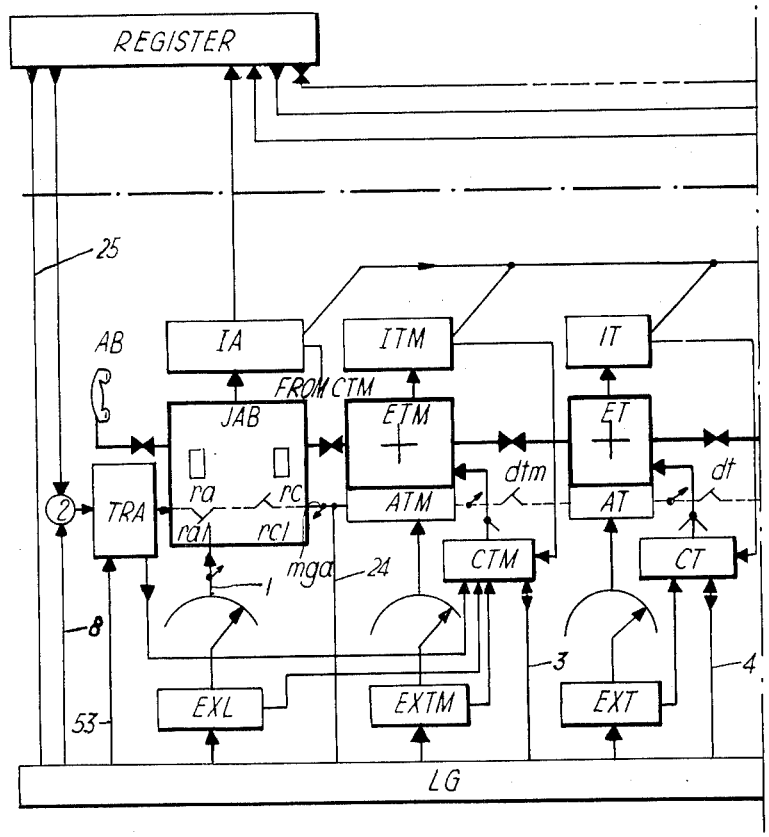
FIGS. 1a, 1b show a diagram of the general operating scheme of the system.
Figure 1B:
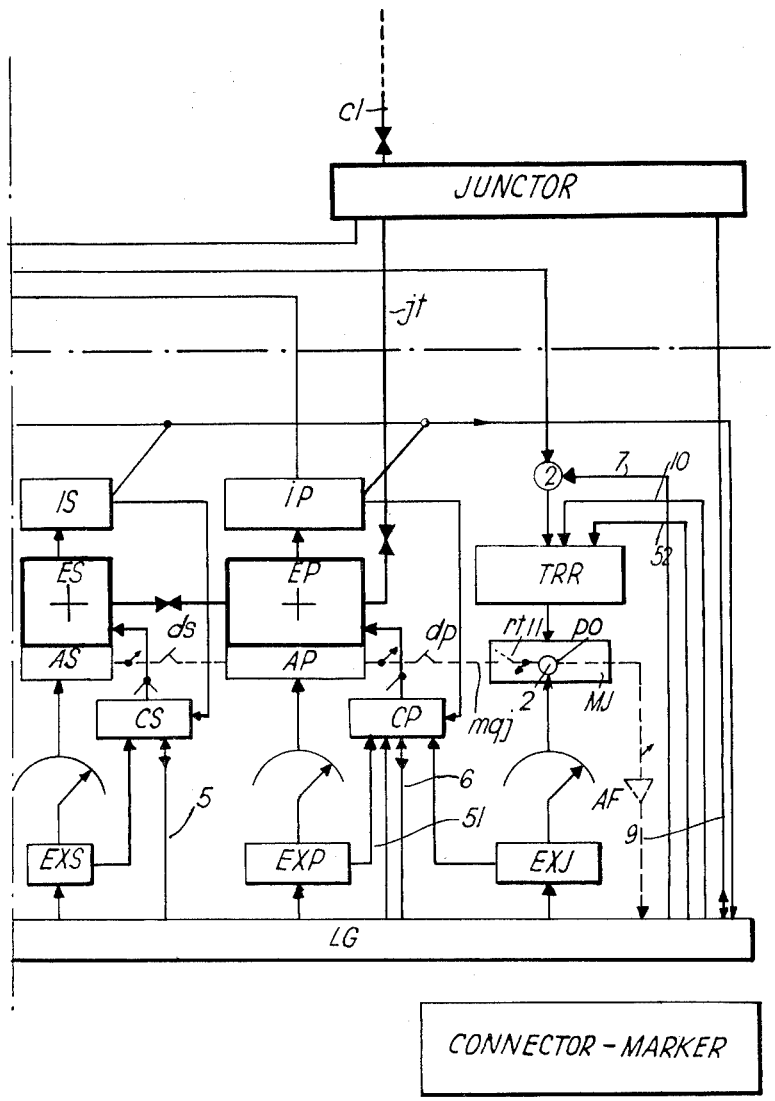
Figure 7:
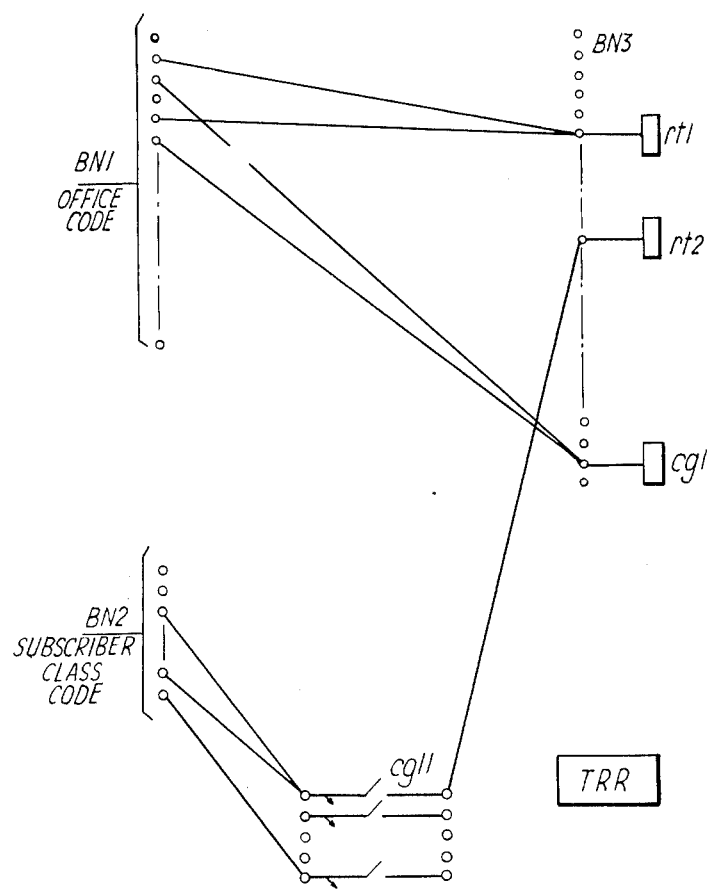
FIG. 7 is a schematic drawing of the routing translator.

At each end of the selection chain, arrangements are provided to "mark" the lines or junctions which must be put into communication. A marking wire $mqa$ is provided for every subscriber (FIG. 1). The said wire is connected upon the banks of the line scanner EXL through the break contact $rc1$ and the make contact $ra1$ when the subscriber makes a call. On the other hand, when the subscriber is called, this wire $mqa$ is connected to the translator of telephone directory number or subscriber's translator TRA through the contacts $rc1$ and $ra1$ in idle condition.

There is no correspondence necessary between a subscriber telephone directory number and the number of his equipment JAB; the function of the translator TRA consists of receiving the said telephone directory number from the register, translate it and mark the corresponding line equipment JAB.

From the primary stage side, the marking is made upon wire $mqj$ by means of a routing translator TRR and by a junction marking device MJ. The translator TRR receives the necessary instructions either from the register or from the logic circuit LG.

A piloting network is associated with the selection chain. Its function is to find out whether there exists one or several available paths between two marked points at the two ends of the chain. The marking wires $mqa$ of the subscribers served by the same terminal section are connected to a piloting amplifier ATM associated with the said section. Each selector of the terminal section under consideration is associated with a break contact $dtm$, the latter being closed when the said selector is available. The amplifier ATM is connected through all the section-selectors contacts $dtm$, to amplifiers AT associated with tertiary sections accessible to the preceding selectors. The piloting network is constituted in a similar manner all the way to the extremity of the selection chain. The amplifier of any one section is connected through break contacts of all selectors of the said section to the amplifiers of the sections of the preceding stage accessible to the said selectors.

Every availability contact $dp$ of the primary selector is connected to a contact $rt11$ controlled by the routing translator TRR. The various contacts $rt11$ of the selectors occupying the same rank in the various primary sections are multiplied upon one AND gate $po$. This AND gate therefore defines the rank of a primary selector in its section. The various gates $po$ are all multiplied upon the final amplifier AF, whose outlet is connected to the logic circuit LG. The entire arrangement made up of gates $po$ and contacts $rt11$ constitutes the junction marking equipment MJ.

Figure 8:
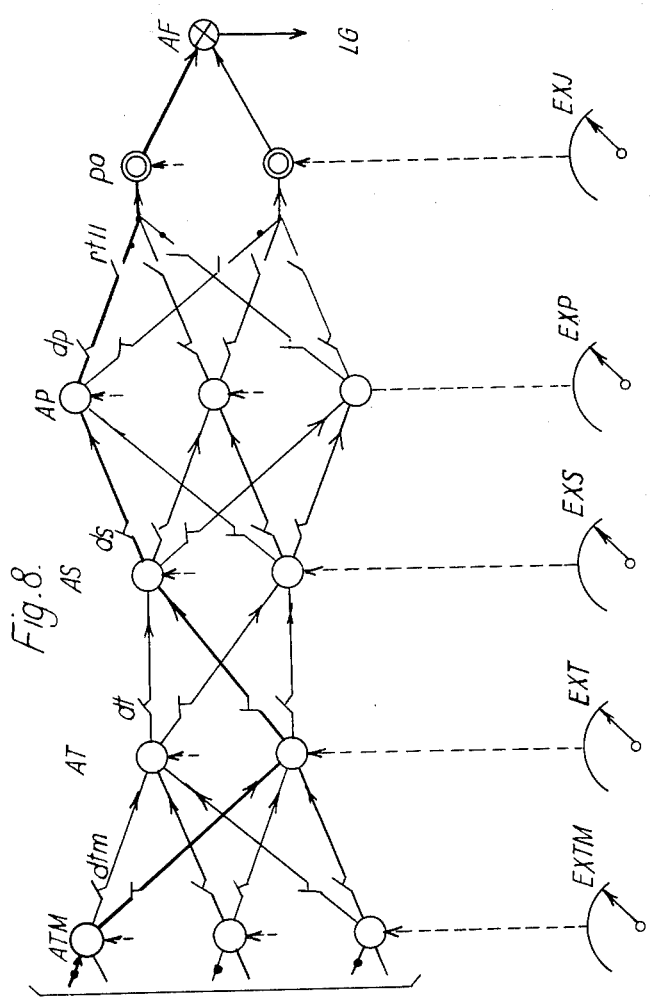
FIG. 8 is a simplified schematic drawing of a piloting network enabling the quest for an available path between the two ends of the selection chain.

In FIG. 8, the piloting circuit is shown in a more explicit manner. Under the reference ATM there is schematically described, by means of circles aligned according to a same vertical line, amplifiers of the various sections of the terminal stage. Under the reference AT all the amplifiers of the tertiary stage sections, and so on are found. The availability contacts of the terminal selectors are aligned according to a same vertical line and placed under the reference $dtm$; the availability contacts of tertiary selectors are represented by $dt$ (column of contacts), and so on. It is clearly seen in this FIG. 8 that the various availability contacts of the selectors of a same section are respectively connected to the amplifiers of the preceding stage ections. The contacts controlled by the routing translator have been represented by $rt11$ (column of contacts), the AND gates by the $po$ column, and the final amplifier by AF.

Aline scanner EXL (FIG. 1) is provided to start the search for a calling subscriber's equipment and to generate impulses along the piloting network. In order to render the drawing clearer, this scanner is represented by a rectangle associated with a rotary switch, but in fact it is constructed with an electronic switch of the well known and currently used type comprising several stages operating on a binary system. Each stage can be made up for instance of a multivibrator. By making use of $n$ multivibrators, $2^n$ possible combinations are obtained. A decoder (not shown in the fig.) receives the said binary items of information and translates them by applying a given potential along only one outgoing wire $l$ corresponding to the unit served. The scanner includes as many positions as there are outlets upon the levels of the terminal selector. It therefore scans, simultaneously, all the subscribers occupying the same rank upon the levels of the terminal stage.

Other scanners made up in a similar way are provided in each stage for scanning the various sections in order to designate only one section for putting a call through. The scanner of the terminal stage has been designated by EXTM; and scanner of the tertiary stage by EXT; the scanner of the secondary stage by EXS and the scanner of the primary stage by EXP. Lastly, a scanner EXJ has been provided for scanning the various junction-marking-devices MJ. Those various scanners are shown in the detailed drawing of FIG. 8.

A control circuit is provided in every selection stage. Its function is to cause the operation of a selection electro-magnet and of a connecting electro-magnet in order to establish the connection. The control circuit of the terminal stage has been designated by CTM; the one of the tertiary stage by CT; the one of the secondary stage by CS and the one of the primary stage by CP.

An identifying unit (or identifier) is provided in every selection stage. The function of these identifying units, taken as a whole, is to detect the identity of the selectors in seized condition in a given connection. The identifying unit of the terminal stage has been represented by ITM; the one of the tertiary stage by IT; the one of the secondary stage by IS and the one of the primary stage by IP. In addition to that, an identifying unit IA is provided to detect the category of the subscriber and his level upon the banks of the terminal selectors.

A logic circuit LG accomplishes the different control and checking operations.

The various pieces of equipment in FIG. 1, other than those which have been represented by a thick stroke, make up the marker. As a rule, the said marker includes only electronic units which operate very fast, therefore, it is only immobilized for a very short while during the establishment of each connection. One marker only may thus be enough to handle the traffic of an entire central exchange, but two markers are provided for reliability purposes.

*Local communication*

The case will now be described of the routing of a call between two subscribers linked directly to the exchange considered here. When a subscriber AB lifts his handset (FIG. 1), his call relay *ra* energizes and the corresponding contact *ra*1 makes. Normally, that is to say in the absence of any communication to be put through or to release, the line scanner EXL which is made up of electronic units with no wear and tear whatsoever scans constantly.

At the same time, the logic circuit LG transmits piloting impulses which appear along wires *l* of the subscribers' junctors scanned by the scanner EXL. At the other end of the selection chain, the logic circuit LG requests the routing translator TRR over wire 10. The latter, through the medium of marking equipment MJ, marks all the piloting wires *mqj* (the feeders) that are available on the calling party side. Each marked wire *mqj* is characterized by the closing of a routing contact *rt*11 or by a semiconductor gate filling the same functions as the contact.

If there is at least one path available between the calling subscriber and the feeders marked as indicated in the preceding paragraph when the scanner EXL reaches wire *l* corresponding to the said subscriber's junctor when the piloting impulses generated by the logic circuit LG will be returned to circuit LG. The return will go through the following circuit: scanner EXL, wire *l*, make contact *ra*1, break contact *rc*1, marking wire *mqa*, terminal stage amplifier Atm, break contact *dtm* of an available selector of the terminal stage, tertiary stage amplifier AT, break contact *dt* of an available selector of the tertiary stage, amplifier AS, break contact *ds* of an available selector of the secondary stage, amplifier AP, break contact *dp* of an available selector of the primary stage, making wire *mqj*, contact *rt*11, gate *po*, amplifier AF, logic circuit LG. Return of the piloting impulses to the logic circuit as described above characterizes the detecting of the calling subscribed and the scanner EXL stops. A piloting circuit such as the one previously described exists for every path liable to link the two ends of the selection chain. All these paths are therefore marked. Only one path among all those that are marked is selected. The scanner EXTM of the terminal state is not of the step-by-step type. It can simultaneously mark several amplifiers ATM to block them. Under control of any by an order from the logic circuit LG, the scanner EXTM starts operating and blocks half the amplifiers ATM so as to eliminate a part of the marked paths. If the logic circuit LG keeps receiving the piloting impulses generated along the marking wire *mqa*, it proves that there still remain available paths among the amplifiers not blocked. In such a case, the scanner EXTM blocks a remaining half of the amplifier ATM and the logic circuit checks whether the piloting impulses are still being received. In the affirmative, the same procedure is repeated until there is only a single amplifier in service. If the piloting impulses will no longer pass at a given stage the blocked half and the unlocked half of the amplifiers are permuted. The piloting impulses are then received once more. A selection operated by this process can be extremely rapid. In case there are, for instance, $2^7=128$ terminal sections to scan, it is only necessary to effect seven test operatons, while 128 would have been necessary if a method of step-by-step scanning were used.

The same selection operations are then repeated in succession in the tertiary stage, in the secondary stage, in the primary stage and in the junction marking devices MJ.

The positions occupied by the various scanners afford a certain amount of information for use in the control of the multiselectors. The scanner EXL indicates the subscriber's rank upon the banks of the terminal stage. The scanner EXTM indicates the terminal section number held for routing the call. The scanners EXT, EXS, EXP, give the same information for the other selection stages. The EXJ indicates the rank of the selector chosen in the primary section. All these items of information are registered in the control devices CTM, CT, CS and CP.

By referring to FIG. 3 it is seen that there is only one link between two given sections belonging respectively to two consecutive stages and it is seen also that there exists a correspondence between the number of the outlet of a stage and the rank of the selector in the next stage. Thus for instance, outlets 1, 2, ... *m'*, of section 1 in the stage of order *n* are respectively connected to the sections 1, 2, ... *m'* of the stage of order *n*+1. Consequently, the horizontal electro-magnet which is to be energized in the stage of order *n* depends upon the section chosen for routing the call in the stage of order *n*+1. Likewise, there is correspondence between the rank of a selector in a stage and the number of section in the preceding stage. Thus, for instance, the selectors occupying the ranges 1, 2, ... *m* in section 1 of the stage *n*+1 are connected, respectively, to the sections 1, 2, ... *m* of the stage of order *n*. Consequently, the vertical electro-magnet which is to be energized in the stage or order *n*+1 depends upon the chosen section for routing the call into stage of order *n*.

In order to control the operation of the multiselector electro-magnet in a stage, for instance in the tertiary stage ET, three items of information must be known, namely, the number of the section chosen in the tertiary stage, the number of the section chosen in the terminal stage and the number of the section chosen in the secondary stage. Those three items of information are given respectively by the scanners EXT, EXTM, EXS and consigned into the electro-magnet controlling devices CT, CTM, CS. The first item of information enables to ascertain the multiselector in which the connection is to be effected; the second item of information gives the horizontal electro-magnet which is to be energized; lastly, the third item of information gives the vertical electro-magnet which is to be energized. In order not to complicate FIG. 1, only one link between tertiary stage ET and the controlling device CT has been represented. The two oblique strokes placed above the said controlling device indicate that the tertiary stage ET also receives items of information from the controlling devices CTM and CS.

In the special case of terminal stage ETM, there does not exist of course any next stage; the horizontal electro-magnet to be energized is determined by the rank of the calling subscriber upon the banks of the said terminal stage. This item of information is given by the position of the scanner EXL. Likewise, the primary stage EP is preceded by no other stage, therefore the vertical electro-magnet is determined by the rank of the selector chosen for putting the call through in the primary section. This item of information is given by the scanner EXJ.

Of course the above described process is only good in the case where there is just a single link between two given sections belonging respectively to two consecutive stages. If this condition is not filled, it is just necessary to simply divide each section in several sub-sections. Similarly, it has been implicitly assumed that the number of a section in a stage was enough to determine without any ambiguity the choosing of the multiselector. Otherwise, the dividing of the sections into sub-sections would also have to be adopted.

When all the selecting indications necessary for the controlling of the multiselectors have been registered in the various stages, the logic circuit LG orders the simultaneous connection in all stages at once through wires 3, 4, 5, 6. According to a well known operating process, first the selection electro-magnet in every stage is energized and then the connecting electro-magnet. This connects the selector to outlet; then the selection electro-magnet is de-energized but the connection is held mechanically. An important item of the system in the present invention is the fact that the circuit of the connecting magnet is also opened, the armature remains in work position due to remanence. Thus current drain is minimized.

Now the checking of the connection established between the calling subscriber and the feeder will be described. The circuit shown by a thick stroke, linking the feeder to the subscriber AB, includes in addition to the usual conversion wires, a third wire or identification wire. Immediately the connection is accomplished, the logic circuit LG gives an order to the controlling device CP (wire 51) to undertake an identification. In order to do so, the controlling circuit CP applies upon identification wire of the chosen primary selector, a given polarity which provokes in the identifier of each stage the recording of all the indications already received in the corresponding controlling device and in the identifier IA of the subscriber's rank on banks of the terminal section. Identifiers of such a type are well known and of current use and are disclosed in French Pat. No. 1,212,783 filed by the C.G.C.T. on July 11, 1958. The explanation here therefore will simply be limited to a quick review of its principle. The third wire of the junction jt or identification wire is a metallic connection to the various selectors to be identified as well as to the calling subscriber's equipment. Inside each identifier the said wire is subdivided successively into several branches. One of which ends in a transistor or similar device characterizing the unity digit of the apparatus to be identified. The second branch ends in a second transistor characterizing the ten-digit of the said apparatus and so on. In such conditions, it is understood why the impulse transmitted along the identification wire causes in every identifier the operation of several transistors each characterizing a digit of the number belonging to the apparatus which is to be identified. Of course, the sets of transistors provided for the various digits in the said number are common to the entire lot of units in a stage. This will necessitate a certain amount of appropriate multiplings. However, in order to avoid any wrong identification, only a single identification operation at a time can be undertaken at a given moment.

The items of information contained in the identifier of each stage, and in the identifier IA, are then compared by the logic circuit LG with those contained in the various controlling devices. These items of information must correspond with one another. If not, it is deduced that the connection between the subscriber and the feeder did not occur. The logic circuit LG drops the various units in seized condition and effects a new search for paths and a new connection. Since there is no order of preference in choosing sections by the various scanners, there is little chance that the same path will be chosen.

In order to check and control the correct connection, it is possible, according to another process, to undertake an identification operation and see whether the signal transmitted along the third wire, junctor side, gives a result at the other end of this wire. That is, if there is no record of an item of information in the category identifier, it is deduced that there is a break of continuity in the connection network. Then the various seized units are released and a new search for available routing paths is undertaken.

If the connection has been established in correct manner between the calling subscriber and the feeder, the marker releases.

The feeder connects then to an available register and the calling subscriber receives the dial tone advising him that he may dial a subscriber's number. This number is received in the register. At the same time, the feeder effects an identification similar to the one just described above. This time it is to obtain from the identifier IA the category of the calling subscriber. The said category is supplied to the register. This is rendered necessary due to the fact that in certain cases (calls onto absent subscribers, forbidden directions . . . etc.), the routing is dependent upon this indication of category.

According to another operating process, a single identification operation can be made for checking the connection and for obtaining the category indication of such a case, a transfer memory is provided for holding this indication temporarily and transmitting it subsequently to a register.

The register causes the seizure of the logic circuit LG through wire 25 by notifying it that this is a local call. A connection between the feeder in service on one hand and the called subscriber on the other hand is then required.

The feeder undertakes a new identification by transmitting the impulse along the identification wire on the called subscriber's side. Although this subscriber is not yet connected, the impulse arrives at the primary selector, enabling to indicate to the identifier IP the rank and section of the primary selector to be utilized for connecting the call subscriber to the feeder. The logic circuit takes notice of this information and orientates the two scanners EXJ and EXP to the corresponding positions.

The routing translator TRR is notified by the logic circuit LG over wire 52 that it has to order the closing of all the contacts or gates rt11 which correspond to the feeders on the called subscriber's side.

The called subscriber's telephone directory number is transmitted by the register to the subscriber's translator TRA; an appropriate signal sent along wire 8 by the logic circuit LG, unlocks an "and" gate and allows the receipt of the telephone directory number. The translator TRA consequently marks the called subscriber by generating piloting impulses along wire *mqa*, under control of logic circuit LG through wire 53. This is only possible if the contacts of calling and cutoff relays *ra*1 and *rc*1 are both in their break condition that is if the called party is free.

When the two ends of the selection chain are marked there is a choice of an available path between the said two ends and the connection. The operating process is the same as in the case of the linking of a calling subscriber with the feeder except for the following differences:

(1) the piloting impulses are generated under control of the subscriber's translator TRA and not under control of the scanner EXL;

(2) after selection of an available path it is translator TRA that gives the rank of the called subscriber upon the banks of the terminal stage;

(3) no selection is made by the scanners EXJ and EXP, the identity of the primary selector, because the section to which it belongs and its rank in that section are known as the said selector is associated in a fixed manner to the called side of the seized feeder. Those two scanners have been orientated as already described above.

Finally, the connection is realized between the two subscribers through two identical selection chains. The ringing current is sent to the called subscriber by the feeder according to usual operating process.

When the conversion is terminated, the feeder is notified and initiates the various operations relating to the release. For that purpose, it orders the seizure of the logic circuit through wire 9, and the identification of the various seized selectors. On the calling party's side the indications recorded on identifiers IP, IS, IT, ITM are respectively transferred in the controlling devices CP, CS, CT, CTM. The subscriber's level upon the banks of the terminal selector written on the identifier IA is also transferred to the controlling device CTM. The various controlling devices are therefore in possession of all the necessary information to determine the connecting electromagnets which are to be demagnetized. This demagnetizing is ordered by the logic circuit LG on wires 3 and 6. Then release is made in the same way on the called party's side. The connection which was previously established between the calling and called parties is entirely released.

Thus, it is seen that the releasing process differs in notable manner from the process used in currently known telephone systems. In the latter, the release of a relay, the so-called "holding relay" is ordered; the other relays and the connecting electro-magnets of the multiselectors being no longer held, release. In the system considered here, since the dialing electro-magnets remain in work condition by mere remanence it is understood why those electro-magnets must be identified so as to demagnetize them.

After each one of both releases, the logic circuit LG checks whether the engaged selectors have been released in correct manner from one end to the other of the selection chain. For that purpose, the indications written in the various controlling devices CP, CS, CT, CTM are transferred into this logic circuit. The latter being in possession of the said indications, routes or orientates the various scanners EXTM, EXT, ESX, EXP, EXJ onto the respective positions they occupied at the instant the connection was established. By any appropriate means such as wires 24, it orders the generation of piloting impulses along all the marking wires *mqa* and causes the closing of routing contacts *rt*11 which correspond to the released side. If all the selectors used previously for establishing the connection have indeed released, the various availability contacts *dtm, dt, ds, dp* are closed; the impulses generated along the marking wires *mqa* are transmitted through the piloting circuit already described above, and they effect return to the logic circuit. In the contrary case, one or several selectors will have remained seized and by means of appropriate tests it is possible to see where the piloting circuit is cut. This defect is of course registered.

After having described the general case of a local call, some particular cases will now be examined. If the called subscriber is busy, one of the two contacts *ra*1 or *rc*1 is open, as was specified above. There cannot be any marking and the piloting impulses do not return to the logic circuit. The latter therefore notifies the feeder which then causes release to take place.

If many subscribers simultaneously effect a call, the line scanner EXL stops upon a given level. The subscribers connected to a corresponding level of the terminal sections are marked alone. Then the scanner EXTM of the terminal stage choses only one section in such way as to have only a single call put through. The connection being established between the subscriber and the feeder, the marker releases and is available to put through a second call. Practically speaking, the period of waiting is negligible; the marker is made up of electronic units which operate in very fast manner, and the control of the multiselectors is simultaneously effected in all the stages. Measures which will be described further on have been taken to speed the operation of the multiselector electro-magnets.

The subscribers' lines grouped together under the same number (PBX lines) are repartitioned upon several terminal sections so that when a group is called there will be only one line marked upon each section. Thus, the scanner EXTM, by choosing a terminal section, determines the group in which the line will be called.

As was already mentioned above, two markers have been provided for reliability purposes. These two markers can function simultaneously, thus accelerating the routing of calls; however, with the object of avoiding the use of two distinct piloting networks, appropriate means are provided in order that one marker only may effect the search for an available path at a given moment. This search is accomplished rapidly, the waiting period of the other marker being practically negligible. Of course, this operation is made in such manner that one marker will not be able to choose a routing path which has already been taken by the other marker. The selection by both markers of the same section in a given stage is also to be avoided since two connections cannot be made simultaneously in the same multiselector. When a marker starts path selection, before being considered as definite, the result of each section scanning is compared with the contents of the memory which contains the result of the choice made by the other marker. If there is any coincidence, the selection of another section is undertaken.

*Outgoing call.*—The case of a call originating from a local subscriber and meant for a subscriber linked to a distant exchange, will now be described. When a local subscriber lifts his handset, he is connected to a feeder and a register just as in the above described case; then he dials a subscriber's number. In case it is a number characterizing an outgoing call, the register causes logic circuit LG to be seized by informing it that this is an outgoing call. The feeder at the same time causes an identification operation to start and the items of information gathered from the various identifying units are written and stored in the memory of the logic circuit. Then the register transmits the office code to the routing translator TRR and the latter acts upon marking equipment MJ by bringing about the closing of contacts *rt*11 of all the available primary selectors that correspond to the direction dialed.

The logic circuit LG then dispatches through wire 24 piloting impulses to amplifier ATM of the terminal section which serves the calling subscriber. Under such conditions there is a search for an available routing path from the calling subscriber to the outgoing circuit junctor, through a second selection chain. However, the logic circuit LG will defer the establishment of the connection in case the subscriber should be dialing a number at the instant considered here. Advantage is taken, therefore, of this interval between a number and the next, to change over to the other selection chain. The logic circuit LG establishes first the connection through the second chain and liberates the first one. In this releasing operation there is no new identification made since the logic circuit has kept in its memory the different indications which enable it to determine the electromagnets to be demagnetized. Then the logic circuit releases.

The calling subscriber is then linked to the outgoing circuit junctor through the second selection chain. The said junctor connects itself by any appropriate means to the seized register and the subscriber may continue dialing. The register transmits then onto the distant central exchange the various digits translated or not translated which are necessary for the selection of the called subscriber. When the latter answers, the connection is established.

When the conversation is terminated, the outgoing circuit junctor is notified, it causes seizure of the logic circuit LG and the release takes place as in the case of a local call, but there is only a single chain of selectors to be released here.

*Incoming call.*—When a call originating from a distant exchange is received in the central exchange considered, the incoming junctor associated with the incoming circuit CI is seized and connects to an available register. The various digits necessary for the selection are received in the register. When the receiving of the digits is terminated, the register effects seizure of the logic circuit LG. Then the incoming junctor dispatches a signal along the identification wire ordering the writing, in the identifying unit IP, of identity of primary selector with which it is associated (section and rank). The logic circuit LG takes notice of this item of information and will, in consequence, orient the scanners EXJ and EXP. The routing translator TRR is notified by the logic circuit that this is an incoming call and it orders the close of all contacts, or the opening of all gates $rt11$, which correspond to the incoming selectors. The register transmits the called subscriber's number onto the translator TRA; the latter will then transmit piloting impulses along wire $mqa$. The selection of an available path between the incoming junctor and the called subscriber takes place, then according to the same operating process as for connection between a feeder and called subscriber. The ringing current is sent by the incoming junctor and when the called subscriber answers, conversation is established. Immediately after the conversation ends, the incoming junctor is notified. It causes the seizure of the logic circuit LG and release takes place as in the case of a local call, but here too there is only a single chain of selectors to be released.

*Transit call.*—As was explained in the beginning of the present description, such a call brings into use a junctor, the so-called "transit junctor" JT, which is connected to banks of an auxiliary tertiary stage ETA (FIG. 2). The register, ascertaining that this is a call in transit, marks a junctor JT. The establishment of the connection between incoming junctor associated with incoming circuit CI and transit junctor JT is then accomplished as in the case of an incoming call. The register will mark the transit junctor JT considered here as it would have done for a subscriber, and the one or several primary selectors associated with the junctors outgoing towards the next central exchange. The search for an available path between the said transit junctors and the outgoing junctor, and the connection, takes place as in the above cases. The conversation is then established through the incoming junctor associated with the incoming circuit CI, a first selection chain, a transit junctor JT, a second selection chain and the outgoing junctor associated with the outgoing circuit CI.

*Special and miscellaneous services.*—As was already mentioned, a special service SS is linked to a selector of the primary stage EP (FIG. 2). A call for a special service is made as if calling an outgoing circuit.

In practice, the multiselectors used include a number of selectors between 16 and 22; and 24 outlets. The number of 24 has been determined by calculating the cost price of the crosspoint (taking into account the electronic controlling and checking units) and multiplying this price by the total number of crosspoints in an attempt to obtain the lowest possible total cost.

Since the present invention does not restrict the way the feeders, the incoming and outgoing junctors, and registers are made, the selection chain described above may of course function in liaison with various types of equipment. However, it is preferable that an equipment comprises electronic units so that their operating speed be comparable to the speed of the selection chain.

Now the various modes of realizing the units which make up the diagram of FIG. 1 will be described.

*Terminal selector frames.*—A terminal selector frame CTM (FIG. 4) contains two multiselectors $ms1$ and $ms2$, the first placed at the higher side and the second at the lower side. Each of these multiselectors contains four sections of four selectors $stm$ each. The 16 selectors of the multiselector $ms1$ are respectively connected to the tertiary sections, Nos. 1 to 16; the 16 selectors of the multiselectors $ms2$ are connected also to these same tertiary sections. In every section only 6 horizontals have been represented, but in fact each of these corresponds to an horizontal bar, thus enabling 24 outlets. Of course, each horizontal bar can occupy two active positions and will then serve two different outlets; an additional horizontal bar or doubling bar (not shown in fig.) provides for double the number of these outlets.

Each subscriber is connected to a given level of two terminal sections arranged on two different vertical columns so as to have access to 8 tertiary sections. The frame CTM includes, in total, $24 \times 8 = 192$ outlets, but as each subscriber is multipled upon 2 outlets, the frame serves only 96 subscribers.

In the other selection stages, the frames are made up in similar manner but include only two sections—one at the upper part and the other at the lower part. Each section contains a number of selectors which depends upon the traffic; in general, this number varies from 16 to 22. Every section gives access to 24 outlets as in the case of the terminal stage.

*Subscriber's translator.*—This translator includes, essentially, a decoder represented in FIG. 5 and a marking distributor (Intermediate Distributing Frame) represented in FIG. 6. In the decoder, there are 10 vertical wires 0 ... 9 connected to the device provided for receiving the "thousand" number, and 10 horizontal wires 0 ... 9 connected to the device receiving the "hundred" number. At each crossing point of a vertical wire and a horizontal wire, a relay associated with a diode is placed. This gives a total of 100 relays $t00 \ldots ct99$. When a given thousand number is received, the corresponding vertical wire is connected to ground, and when a given hundred number is received, the corresponding horizontal wire is connected to the battery, causing the energizing of only one relay $ct$, which characterizes the hundred group of the subscriber inside the central exchange. The diodes provide isolation.

Under the relay matrix, ten wires 0 ... 9 are connected to the device which receives the ten group number. Each one of these wires is multipled upon 100 contacts belonging respectively to the 100 relays $ct$, providing a total of 1000 outgoing wires connected respectively to the relays $dz000 \ldots dz999$. The symbol $$\underset{ct00/99}{0}$$

designates the contacts, Nos. 0 of relays $ct00 \ldots 99$, and likewise, the symbol $$\underset{ct00/99}{9}$$

designates the contacts, No. 9 of these same relays. When the ten group number is received, the corresponding wire is connected to ground. Since there is already a relay $ct$ energized among the 100 group, a relay $dz$, characterizing the subscriber's ten group inside the central exchange, operates.

Also, 10 wires $0 \ldots 9$ are connected to the device which receives the unit digit. Each of these wires is multipled upon 1000 contacts belonging respectively to the 1000 relays $dz$, enabling thus to obtain in total 10,000 outgoing wires $st0000 \ldots st9999$. When the unit digit is received, the corresponding wire is connected to the logic circuit LG (wire 53 in FIG. 1) and receives the piloting impulses. Since there is already a relay $dz$ energized among the 1000, the said impulses are dispatched along one of the 10,000 outgoing wires $st0000 \ldots st9999$ which characterize the subscriber without any ambiguity whatsoever.

The 10,000 wires $st0000 \ldots st9999$ are respectively connected to the left hand terminals of the marking distributing frame RP1 (FIG. 6). The 10,000 right hand terminals of the said distributing frame are connected respectively to the 10,000 subscribers' equipment JAB. In realizing suitable connections by means of jumper wires between the left and right terminals of the distributing frame RP1, it is possible to make any subscriber's equipment JAB correspond to a given telephone directory number. It is possible, in particular, to transfer a subscriber's line from one equipment to another for various reasons and namely for the purpose of equilibrating the traffic. In the example shown here, some telephone numbers, such as the number 4150, correspond to a single equipment JAB. Other numbers (4203) correspond to several equipment JAB (lines grouped, or PBX); and lastly, numbers such as 4204 enable to call an often used line in a group. Diodes, such as $di1$ used in this case and used for isolation prevent mixing due to the common points, thus avoiding the wrong markings.

Each wire 10, leaving the distributing frame RP1, is connected through an idle contact $ra1$ of a calling relay and an idle contact $rc1$ of cutoff relay to the marking wire $mqa$ giving access to the piloting network.

The make contact $ra1$ of calling relay is connected to a given position of the line scanner as already mentioned above.

The marking distributing frame in FIG. 6 can be simplified by repartitioning the left hand terminal and the right hand terminals into groups of 1000 lines. Inside each group, all the desired mixings can be made, but in general, the mixing of among several thousands represents a case of exceptional character.

The subscriber's translator causes two relays to operate successively, namely a 100 group relay and a ten group relay. The operation of these two relays can be accelerated by using a transistor circuit which will be described subsequently by referring to FIGS. 16 and 17 so as to obtain rapid translation. It is also possible to detach the said translator from the marker, that is to say, to accomplish the translation first and then accomplish the marking so that time spent for the translation should not delay the marker.

*Routing translator.*—This translator is essentially made up of routing code decoder and of a marking distributing frame. The decoder receives all digits of a called subscriber's office code from the register and orders in consequence the connection to ground of one terminal of the marking distributing frame. The decoder can operate by means of a scheme similar to the one in FIG. 5. The marking distributing frame (FIG. 7) comprises three sets of terminals BN1, BN2 and BN3. Each terminal BN1 corresponds to an office code to be translated. Each terminal BN2 corresponds to a subscriber's category indication; finally, each terminal BN3 corresponds to a routing indication. In achieving suitable connections between the terminals BN1 and BN3 by means of jumper wires, it is possible to make a given office code correspond to a desired routing by energizing a route relay such as $rt1$. Certain office codes give place only to a single routing (route relay $rt1$). But other office codes give place to several different routings according to the calling subscriber's category. Thus, some subscribers will be able to reach a toll circuit; others will get connected to an operator in case they dial the number of this circuit. In order to obtain such operating means, a relay $cg1$ is energized as soon as the office code to be translated is received. This relay orders the closing of a certain number of contacts such as $cg11$. Then the route relay $rt2$ indicated by the index dialed and the calling subscriber's class is energized.

Each route relay $rt1$ includes, in principle, one contact $rt11$ (FIG. 1) per primary selector to be marked.

Figure 9:
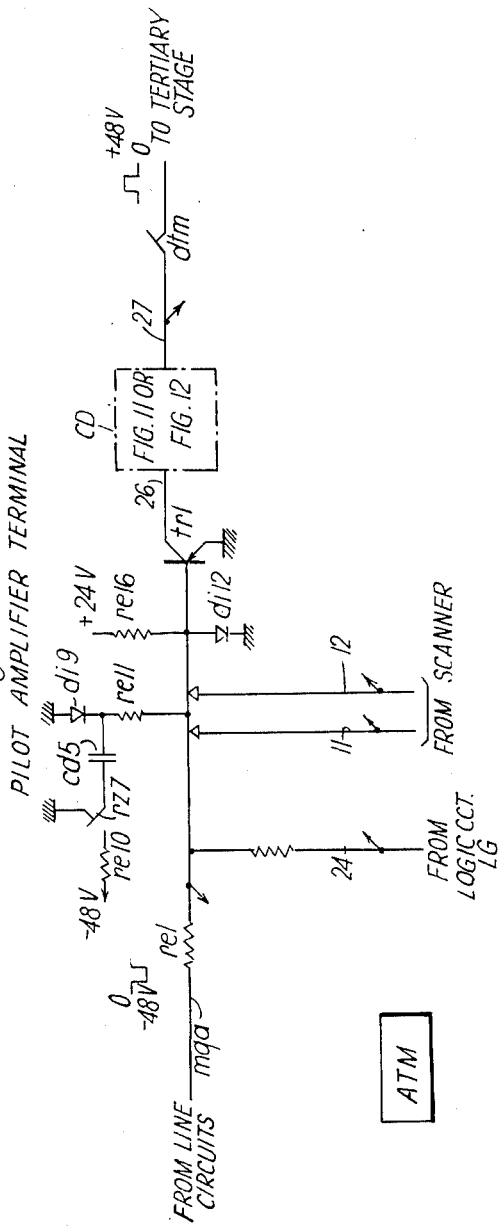
FIG. 9 shows an amplifier for the piloting circuit of a terminal selection stage.

*Piloting amplifiers.*—FIG. 9 shows the pilot amplifier ATM of a section of the terminal stage. The various marking wires $mqa$ of the subscribers connected to the terminal section considered here are multiplied through resistor $re1$, the base of a transistor $tr1$. Normally, that is to say in the absence of piloting impulses, each marking wire $mqa$ is connected to ground. The transistor is blocked by the potential $+24$ v. applied to its base through resistor $re16$. When a piloting impulse of $-48$ v. is received along a marking wire, the transistor $tr1$ is saturated; its collector's potential goes from $-24$ v. (or $-48$ v.) to a potential neighboring ground. The positive impulse thus collected is transmitted, through decoupling circuit CD and availability contacts $dtm$ of all the selectors of terminal section considered here, to the tertiary sections which are accessible to the said selectors.

Normally, the wires 11 and 12, which end up onto the scanner, are open and the amplifier can operate. When due to a $+1$ v. potential applied to one of these two wires, the transistor $tr1$ is blocked then the amplifier can no longer transmit any piloting impulse. In fact, the scanner is made up of two elementary scanners of $n$ positions, making $n^2$ positions obtainable. In order that amplifier ATM be unlocked, it is necessary that both wires 11 and 12 be simultaneously open. If only one of these two wires receives a potential of $+1$ v. the amplifier is blocked.

Figure 11:
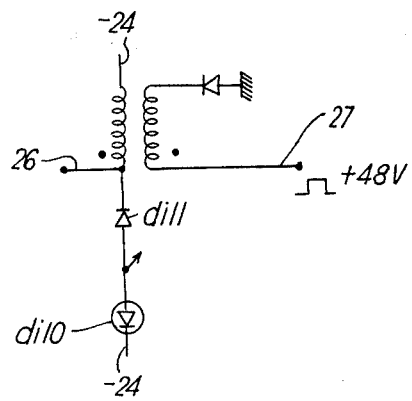
FIG. 11 shows a decoupling circuit for a piloting amplifier utilizing a transformer.
Figure 12:
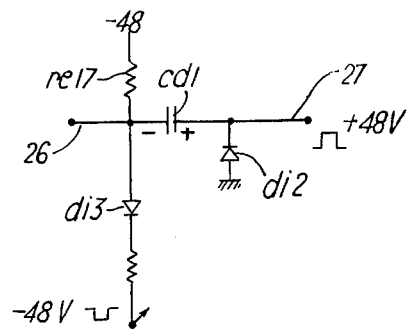
FIG. 12 shows a decoupling circuit for a piloting amplifier utilizing a capacitor.

In the absence of the decoupling circuit CD, a disturbance occurring in the transistor $tr1$ may cause the apparition, along wire 26, of a continuous potential which will simulate a piloting signal and will be transmitted onto all the tertiary sections accessible to the terminal section considered here. The aim of circuit CD is to D.C. isolate the amplifier ATM and the tertiary sections; and to prevent repercussions throughout the entire network due to the disturbance. Two examples of decoupling circuits are shown in FIG. 11 and 12. In FIG. 11 a simple transformer is used whose primary winding is connected to the collector of transistor $tr1$ through wire 26. The other extremity of this winding is placed at $-24$ v. potential in order to have the collector of the transistor suitably biased. The transformation radio may be 2, a positive impulse of $+48$ v. is gathered from outgoing wire 27. When the piloting impulse ends, a certain over-voltage appears along wire 26. The value of that over-voltage is enough to unlock the Zener diode $di10$. The discharge current flows at constant voltage through the said diode. Under normal operating conditions, that is to say in the absence of any over-voltage, the circuit of the Zener diode is eliminated due to presence of diode $di11$.

In FIG. 12 the decoupling circuit is essentially made up of a condenser $cd1$ which in the absence of any piloting impulse is charged up by means of a $-48$ v. source of impulses, through diodes $di2$ and $di3$. The $-48$ v. potential which is applied to wire 26 through resistor $re17$ is used for biasing the collector of transistor $tr1$. When an impulse is received along wire 26, that is to say when its potential passes from $-48$ v. to the right hand terminal of condenser $cd1$ passes to $+48$ v. and, as in the preceding case, a positive impulse of $+48$ v. is gathered therefore from outgoing wire 27.

The function of the circuit of resistor $re16$ (FIG. 9) is to limit the transistor's idle-condition current which may gain dangerous intensity with rise of temeprature. Furthermore, it fixes the operating threshold of the said transistor and helps avoid untimely current flow through the transistor caused by the negative low potentials transmitted throughout the multiplings.

Wire 24 is used for transmitting piloting impulses from logic circuit LG to mark the calling subscriber at the instant wherein the changeover is being made of the chain that intervenes in case of an outgoing call, and to check the release of the selectors by achieving a piloting test through availability contacts of these selectors.

Figure 10:
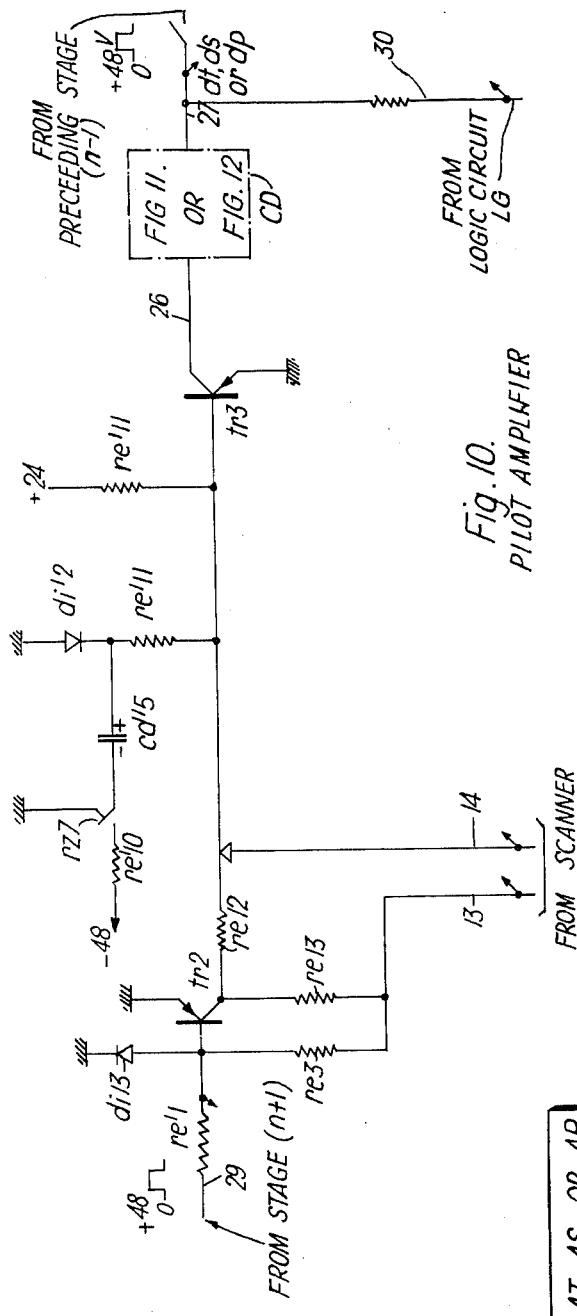
FIG. 10 shows an amplifier for the piloting circuit of any one of the other selection stages.

The piloting amplifier shown in FIG. 10 is used for the tertiary stage, the secondary stage and the primary stage. The line sections 29 of the piloting network originating from the next stage (stage of the order of $n+1$) are multiplied through the resistors $re'1$ upon base of transistor $tr2$. In order that the amplifier be conductive, its collector must be current fed by means of a $-12$ v. potential. This is the function of one of the two elementary scanners which applies the said potential through wire 13. Normally, that is to say in the absence of any reception of piloting impulses, the wire 29 is connected to ground, but because of the $-12$ v. potential applied to wire 13 and because of the values of resistors $re'1$, $re3$, the base of transistor $tr2$ will be found at a negative potential and the transistor is saturated. Its collector is therefore connected to ground and this blocks the transistor $tr3$. When a $+48$ v. piloting impulse is received along wire 29, the transistor $tr2$ is blocked; its collector's potential passes from 0 to $-12$ v. and under reserve that this potential be not absorbed by the second elementary scanner which is branched to wire 14, the transistor $tr3$ saturates. Due to this fact, its collector's potential passes from $-24$ v. (or $-48$ v.) to a potential which is neighboring ground. The positive impulse thus collected is transmitted through decoupling circuit CD and availability contacts $dt$, $ds$ or $dp$ of all selectors of the section considered here, onto the sections of the preceding stage (stage of the order of $n-1$).

The wire 30 which ends upon logic circuit LG is used when checking of release is taking place. In case one of the selectors of the chain has not released, the checking impulse cannot be transmitted from one extermity to the other of the piloting circuit as already mentioned. It is possible to see then by means of wire 30 where a continuity exists by effecting tests in different intermediary points of the circuit.

*Circuit of temporary busy-condition of the sections.*—
Due to their elasticity, the selection fingers placed on the horizontal bars of the multiselectors vibrate a certain amount of time after release of these bars. This vibrating may cause an untimely connection if a new call suddenly happens and uses that same multiselector.

To avoid such an inconvenience, a temporary busy-condition circuit shown in FIGS. 9 and 10 has been provided for each section. When a connection is made in a given multiselector, contact $rz7$ (FIG. 9) makes the condenser $cd5$ charge up through the diode $di9$ and resistor $re10$. When the connection is made, the contact $rz7$ restores to idle condition. Due to this fact the potential of the right hand terminal of condenser $cd5$ passes from 0 v. to $+48$ v., thus blocking the transistor $tr1$ and subsequently the amplifier of the section considered here. Then the condenser discharges through resistor $re11$ and diode $di12$ and the amplifier may function once more. The section was therefore occupied all during the period corresponding to discharge of condenser. The diode $di9$ prevents the short circuit of the condenser $cd5$ when contact $rz7$ restores to its idle condition.

A similar arrangement has been provided in the piloting amplifier of FIG. 10. The only difference with FIG. 9 is the fact that the circuit of discharge of condenser $cd'5$ is as follows: ground, condenser $cd'5$, resistor $re'11$ and $re12$, collector and base of transistor $tr2$, diode $di13$ to ground.

Figure 13:
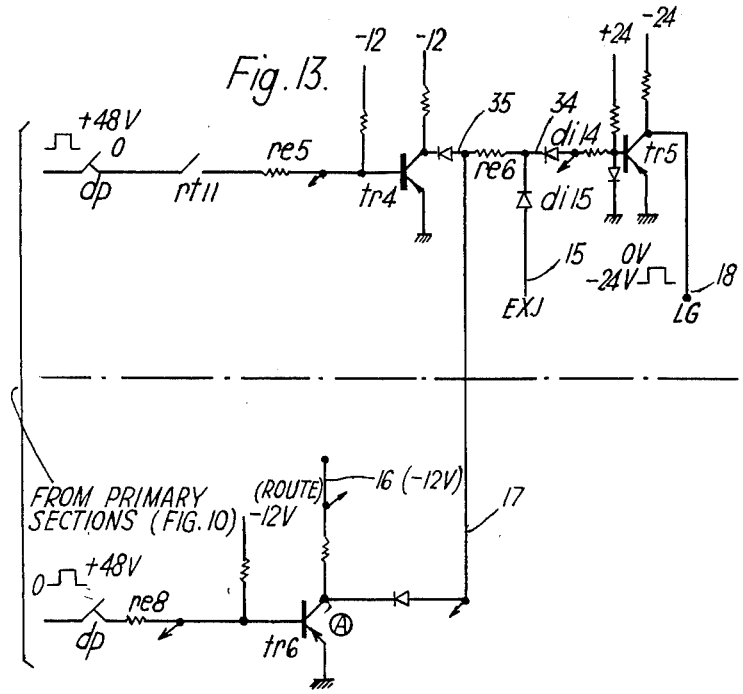
FIG. 13 shows an amplifier for the piloting circuit of the junction marking equipment.

FIG. 13 corresponds to the junction marking equipment MJ and to the amplifier AF in the general-operating diagram. As already mentioned above, a primary selector is associated in a rigid manner with a junction that corresponds to a well determined direction. This direction may characterize either a local call or a bundle of outgoing circuits. The availability contact $dp$ of a primary selector is connected to the contact $rt11$ of the route relay which characterizes the direction that is assessible to the said selector. The contacts $rt11$ of the primary selectors occupying the same rank in the various sections are multipled through a resistor $re5$ upon base of a transistor $tr4$. The transistor $tr4$ characterizes therefore a rank of selectors inside any primary section; if the largest section contains 22 selectors, 22 transistors $tr4$ are provided. Normally, that is to say in the absence of any piloting impulse being received, the base of this transistor will be at $-12$ v. potential and the said transistor is conductive. Due to this fact, its collector finds itself at a potential close to ground. The transistors $tr4$ are all multipled through resistors $re6$ and diodes $di14$ upon the base of a same transistor $tr5$ which corresponds to final amplifier AF in FIG. 1. Normally, the said transistor happens to be blocked by the positive potential applied upon its base and its collector happens to be at $-24$ v. potential. This collector is connected to the logic circuit LG.

When a primary selector is marked in order to put a call through, the corresponding contact $rt11$ is closed and when the $+48$ v. piloting impulse is received, the transistor $tr4$ is blocked. Its collector happens to be at a potential of $-12$ v. then; the transistor $tr5$ is unlocked, an impulse of about 0 v. being then transmitted to the logic circuit LG. As in the preceding cases, the scanner EXJ can block the transistor $tr5$ by applying a potential of $+1$ v. upon wire 15. The apparatus made up of resistor $re6$ and diode $di15$ corresponds to the AND gate $po$ shown in FIG. 1; the $-12$ v. potential which is necessary to the operating of transistor $tr5$ will only be applied onto outgoing wire 34 if a potential of $-12$ v. is found along wire 35 and there is nothing found along wire 15. The diodes $di14$ simply act merely to decouple. The final position of the scanner EXJ characterizes, inside the primary section, the rank of the selector chosen.

In the lower part of FIG. 13 another embodiment of junction marking equipment is shown which is particularly interesting in the case of directions comprising a large number of circuits. The contacts $dp$ of the primary selectors which give access to the same direction and which occupy the same rank in the various sections are multipled through the resistors $re8$, upon the base of a same transistor $tr6$. This transistor will therefore characterize at the same time a determined direction and a rank of selectors inside a primary section. The transistors $tr6$ which correspond to the same direction are all multipled upon the wire 16 connected to the routing translator. On the other hand, the transistors $tr6$ which correspond to the same rank of selectors inside the primary sections are all multipled on wire 17. It is seen therefore that the transistors $tr6$ are grouped in two different ways; the multipling on wire 16 corresponds to a grouping by directions, and the multipling on wire 17 corresponds to a grouping by selector ranks. The various wires 17, which characterize a selector rank, are all multipled upon transistor $tr5$ through the resistors $re6$ and the diodes $di14$.

When it is required to mark a given direction, the wire 16 is brought to potential −12 v., and the transistor $tr6$ is made conductive. Due to this fact, its collector is at a potential close to ground potential, and the transistor $tr5$ is blocked. When a piloting impulse of +48 v. is received from the implifier of a primary section, the transistor $tr6$ blocks itself. The −12 v. potential gathered from its collector is transmitted to the base of transistor $tr5$, which becomes conductive. An impulse of 0 v. is transmitted to the logic circuit. As in the preceding case, the final position of the scanner EXJ indicates the rank of the primary selector chosen for putting the call through. When a direction is not marked, its wire 16 is connected to ground and no impulse can be transmitted to logic circuit LG.

The marking operations by transistors are very economical. Thus, for instance, if we consider a bundle of 80 outgoing circuits repartitioned upon the first four selectors of the 20 primary sections, only four transistors $tr6$ are used.

Figure 14:
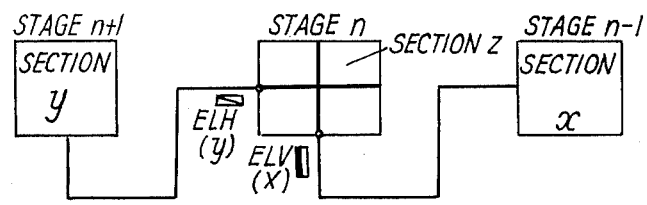
FIG. 14 is a layout drawing showing how the choice is made of a horizontal bar and a vertical bar when the identity of the sections in seized condition in the two neighboring selection stages is known.

*Control circuit of the multiselectors.*—As already mentioned above, three information elements are necessary to control the electro-magnets of a multiselector in a stage of the order $n$. It is necessary to know the number of the section chosen in the said stage which gives the identity of the multiselector; the number of the section chosen in the stage $n+1$ which gives the horizontal electro-magnet; and the number of the section chosen in the stage $n-1$ which gives the vertical electro-magnet. In FIG. 14 these three elements are designated by the letters $z$, $y$ and $x$. The horizontal electro-magnet and the vertical electro-magnet are represented by ELH and ELV respectively.

Figure 15:
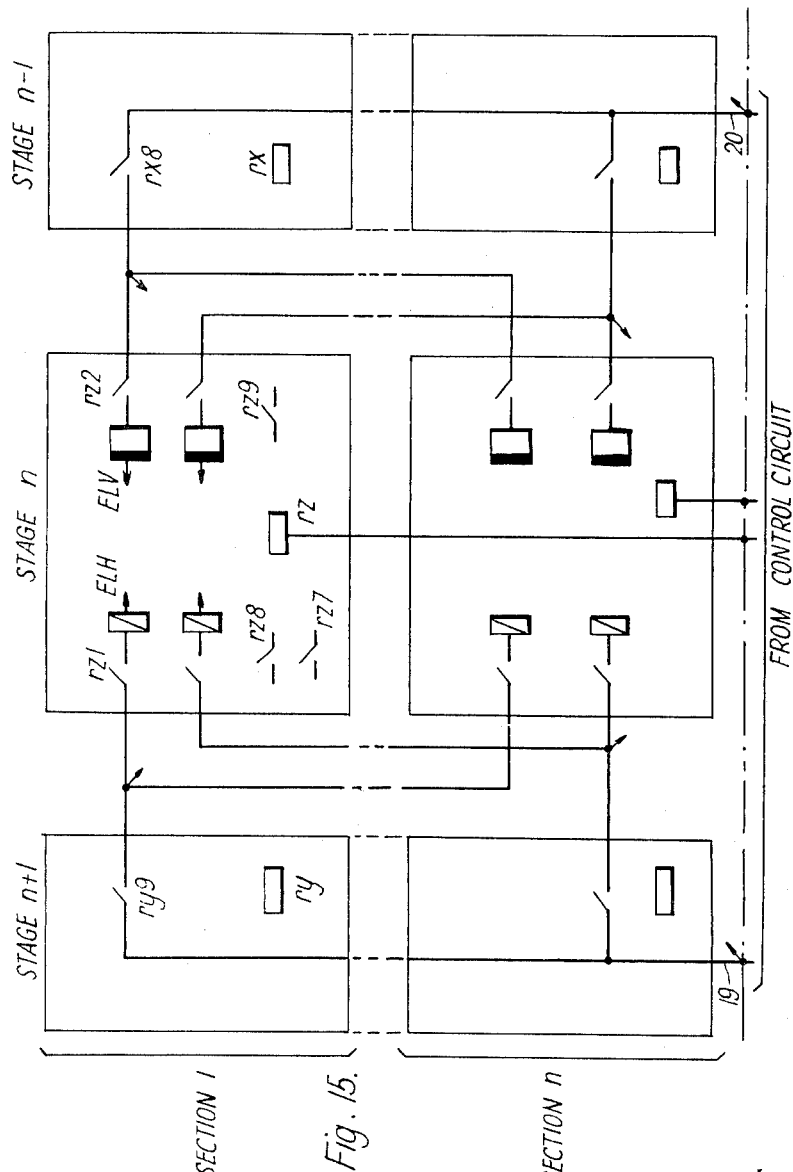
FIG. 15 shows a circuit of the controlling device of the horizontal electro-magnet and vertical electro-magnet in a selection stage.

When the control is to be started of electro-magnets of a multiselector in the stage of the order of $n$ (FIG. 15), three relays are energized:

(1) a relay $rz$ characterizing the number of the section chosen in the stage of order $n$;

(2) a relay $ry$ characterizing the number of the section chosen in the stage of order $n+1$;

(3) a relay $rx$ characterizing the number of the section chosen in the stage of order $n-1$.

The energizing of those various relays is caused by the controlling circuits of the three consecutive stages, the latter having themselves registered the indications supplied by the various scanners. These circuits will cause, then, the applying of ground to wire 19, and subsequently to wire 20. The next two circuits are thence completed:

(1) ground to wire 19, work contact $ry9$, work contact $rz1$, horizontal electro-magnet ELH, battery;

(2) ground to wire 20, work contact $rx8$, work contact $rz2$, vertical electro-magnet ELV, battery.

These two electro-magnets energize and they order, in well known and currently used manner, the connecting of the selector to the output. Then the ground is cancelled from wires 19 and 20; the horizontal electro-magnet ELH releases but the vertical electro-magnet ELV holds by simple remanence. This holding-of-electro-magnet process is indicated by a black band which lies on one lateral side of the said electro-magnet.

Of course the relay $rz$ must include a contact such as $rz1$, per horizontal electro-magnet; and a contact such as $rz2$, per vertical electro-magnet. Furthermore, there are three other contacts provided on this relay:

(a) a contact $rz9$ for preparing the circuit of the horizontal electro-magnet in the preceding stage (stage $n-1$);

(b) a contact $rz8$ for preparing the circuit of the vertical electro-magnet in the next stage (stage $n+1$);

(c) a contact $rz7$, also represented in the piloting amplifiers (FIGS. 9 and 10), for temporary occupying of the sections.

The operating process is the same when it is necessary to demagnetize the vertical electro-magnet when liberation takes place; only the flow of current direction changes in wire 20 and no potential is applied to wire 19.

The operate time of a relay or of an electro-magnet is determined by an electric constant and by a mechanical inertia. It was shown by measurings that the electric time constant was greater. The mechanical inertia is rapidly overcome when the necessary current is reached. Since it is not possible to increase the feeding voltage which is set once and for all in a given exchange, the only means of enabling the current to increase rapidly is to diminish the self inductance of the coil by reducing the number of winding turns. But, the resistance of the coil will then be very small and the current would have a tendency to become very high. Therefore, it is necessary to limit the current to a power value corresponding to maximum induction.

In order to obtain fast operation from the electro-magnets of the multiselectors without using excessively high currents, the arrangement shown in FIG. 16 is used. Control wire 19 is connected to the collector of a power transistor $tr7$. To order the operation of the horizontal electro-magnet EIH, closure of two decoding contacts is effected as previously mentioned. Then there is generated on the transistor's emitter an impulse of amplitude $I_o$ sufficient to obtain saturation. The impedance presented by the collector's circuit is negligible, wire 19 is then at a potential close to ground. The voltage E thus obtained at the terminals of the electro-magnet causes the latter to operate very rapidly. Because of the self-inductance of the electro-magnet, the current I grows as shown in FIG. 17 and reaches a value which depends upon the gain of the transistor. Practically speaking, this gain is close to unity. As seen in FIG. 17, this value of current I thus obtained is smaller than the one obtained by eliminating the transistor and by putting the electro-magnet directly under voltage E. In designating by a letter R the resistance of the electro-magnet which is very small, the above-mentioned valve I will be $E/R$. The above described operating process presents therefore the double advantage of causing a fast operation of the electro-magnet while at the same time limiting the current to a reasonable value immediately the electro-magnet has energized.

FIG. 17 shows a curve giving the absolute value of the potential upon wire 19 in relation to time. Before the appearance of controlling impulse $I_o$, this voltage is of course equal to E. When the said impulse is received, this voltage passes abruptly to 0 and holds as long as the transistor is saturated. When the current, flowing in the electro-magnet, reaches the value $I_o$ which corresponds to the gain of the transistor, the latter will operate in the same way as a Class A amplifier. The potential existing on wire 19 is equal to the difference between E and the fall in potential $RI_o$ in the electro-magnet. In this FIG. 17 it is seen that the value $RI_o$, which is enough to cause operation of the electro-magnet, is weak as compared to value E used for obtaining a fast operation.

The impulse $I_o$ is cancelled as soon as it is no longer necessary. In the case of a horizontal electro-magnet, the cancelling of impulse is made immediately after the connection between the selector and the output has been accomplished. In the case of a vertical electro-magnet it is possible to cancel as soon as the electro-magnet has operated, since the latter holds, then by simple remanence.

When the impulse $I_o$ is cancelled, there takes place, due to the self-inductance of the electro-magnet, an over-voltage upon wire 19 which might cause the destruction of the transistor in the absence of special precautions.

A circuit has therefore been provided which includes an ordinary diode $di16$ placed in series with a Zener diode $di7$. The circuit is connected to the negative potential $-E$. The over-voltage, existing upon collector of the transistor, is enough to unlock the Zener diode; the current then flows from wire 21 to the collector. The function of diode $di6$ is to avoid current being shunted through wire 21 during the energization of the electro-magnet. In FIG. 17 it is seen that the current I, flowing in the electro-magnet, decreases progressively from $I_o$ to 0; the time necessary for the current to cancel itself is about 1.5 milliseconds so that no troublesome inductance effect is produced on the neighboring circuits. If the Zener voltage of diode $di7$ is designated by U, the potential, existing on collector of the transistor, is of $E+U$. Because of the properties of the Zener diode, this potential remains constant as long as the diode is unlocked and restores then to value E at the exact moment the current I cancels itself.

The circuit of the Zener diode enables an extremely rapid disappearance of the current and of course at constant voltage. This feature is as interesting as is the fast current use. The release time of the electro-magnets is reduced, thus shorting the time of immobilization of the marker. Also, wear and tear of the contacts is prevented and the disturbing noises are avoided due to the fact that the current is completely cancelled when the decoding contacts open.

The scheme of FIG. 16 is adapted in each particular case. It is used in the same way for the operation of the horizontal electro-magnets. For the vertical electro-magnets, suitable means enable either the sending of a magnetizing current or the sending of a demagnetizing current.

In the case of connection relays (relay $rz$ in FIG. 15) a matrix decoding is effected by means of a scheme similar to the one in FIG. 5. In such conditions, it is enough to use transistor for every row and for every column. By using for instance ten transistors for the rows and ten transistors for the columns, it is possible to operate a connection relay chosen among a hundred. As the two ends of the connection relay are current fed by means of a similar device, the current necessary is less and ordinary transistors can be used in place of the power transistors.

*Identifying units.*—The identifying of the various elements used for the establishing of a connection brings into effect a wire which is distinct from the two conversation wires and is shown as a third wire or wire $c$ (FIG. 18). This wire starts from the feeder or from the junctor and crosses the successive selection stages, EP, ES, ET, ETM to end up finally upon subscribers' equipment JAB. It includes several branch wires $c1$ . . . $c7$ which lead out to various points in the selection chain. The wires $c1$ and $c2$ originate from the primary selector; the wires $c3$, $c4$, $c5$ originate from the secondary selector, from the tertiary selector and from the terminal selector, respectively; the wires $c6$ and $c7$ originate from the subscriber's equipment. The wires $c1$, of the selectors having the same rank in the various primary sections, are all multipled on a same point $j$ which is connected to the primary identifying unit IP. The wires $c2$ of all the selectors in the same primary section are multipled on a point $s$ which is connected to the same primary identifying unit IP. Wires $c3$, $c4$ and $c5$ are set out in the same manner in the other selection stages; they are grouped by sections in order to finish up to the identifying units IS, IT, ITM. Wires $c6$, corresponding to subscribers occupying a same rank on the banks of the terminal selectors, are multipled upon a point $n$ which is connected to the identifying unit IA. Lastly, the wires $c7$ of the subscribers of same category (or class) are multipled upon a same point $cg$ which is connected, also, to the identifying unit IA.

Thus, when the feeder or junctor generates an identifying impulse along wire $c$, the following indications will be made to appear in the various identifying units:

(1) Identifying unit IP: rank of the primary selector and number of the primary section;

(2) Identifying unit IS: number of the secondary section;

(3) Identifying unit IT: number of the tertiary section;

(4) Identifying unit ITM: the number of the terminal section;

(5) Identifying unit IA: subscriber's rank on the banks of the terminal selectors and subscriber's category (or class).

In FIG. 19 there is shown a mode of realizing an identifying unit enabling to express each digit, of an indication, in the form of code "2 out of 5." It will be assumed, in order to fix one's mind, that it be the case of identifying a terminal section number. From wire $c$ there goes out a derivation $c5$ which corresponds to a given terminal selector as mentioned in the description of FIG. 18. The various wires $c5$ of the selectors of a same terminal section are all multipled on the same point $s$; which characterizes the number of that section. The different points $s$ which correspond to the same decimal figure in a given rank are connected through the decoupling diodes $di8$, to a same point $pt1$ which characterizes therefore a digit of given rank and nature. Thus, for intance, if there exists at a maximum 100 terminal sections in the central exchange, two digits are enough to characterize one among them; under such conditions, 10 points $pt1$ are provided which correspond, respectively, to the 10 group-of-ten digits; and 10 points $pt1$ which correspond, respectively, to the 10 unity-digits which gives as a total 20 points $pt1$ for the terminal stage.

In order to achieve the translation of a decimal number of a given rank in code "2 out of 5," use is made of five transistors $tr9$ through $tr13$. The points $pt1$, corresponding to the decimal numbers which have to be translated by the code element No. 1, are all connected to base of transistor $tr9$ through transistor $tr8$, condenser $cd3$ and register $re14$. The points $pt1$, corresponding to the decimal numbers which have to be translated by the code element No. 2, are all connected to base of transistor $tr10$ through transistor $tr8$, condenser $cd3$ and register $re15$, and so on. Since a decimal number is translated by two code elements, out of the five possible ones, each point $pt1$ is connected to two transistors. The transistors $tr8$ and the transistors $tr9$ and $tr10$ make up the two stages of an amplifier. The condenser $cd3$, inserted in between these two stages, serves a decoupling function. The collectors of the transistors $tr9$ through $tr13$ are connected through wires such as 22, 23, to a memory ME provided for registering the codes "2 out of 5." The memory ME can be made up of bistables.

In the example chosen here, a set of five transistors $tr9$ through $tr13$ has been provided for the ten-group number and a set of five identical transistors for the unity-number. Since these transistors are used for a large number of selectors, they are paralleled for reliability purposes by transistors $tr'9$ through $tr'13$ which are mounted in the same way and have an identical function.

Normally, that is to say in the absence of identification impulses, the wire $c$ is connected to ground and the transistor $tr8$ is blocked. Its collector is therefore at potential $-24$ v. The condenser $cd3$, placed in between a source of $-12.8$ v. and this $-24$ v. potential charges itself up through resistor $re9$. Transistors $tr9$ and $tr10$ of type NPN are also blocked since the potential of the base $(-12.8$ v.$)$ is lower than the potential of the emitter $(-12$ v.$)$.

When an identification impulse of $+48$ v. is received on point $pt1$, the transistor $tr8$ is unlocked. Its collector's potential passes from $-24$ v. to 0 v. approximately. Due to this fact, the lower terminal of condenser $cd3$ also undergoes a rise of potential of 24 v., and this saturates the two transistors $tr9$ and $tr10$. A $-12$ v. impulse is therefore transmitted upon each of the outgoing wires 22 and 23 and thus a code "2 out of 5" is recorded in the memory.

*Conjugated selection between central exchanges.*—FIG. 20, a junction diagram is represented which includes two exchanges CN and CN1. In the exchange CN there are provided: subscribers AB, a selection chain CS made up in the same way as the one shown in FIG. 1 and giving access to a certain number of circuits to distant exchange CN1. The piloting wires *pl* that correspond respectively to those various circuits have been represented alone. The exchange CN1 is similarly made up and includes: subscribers AB1, a selection chain CS1 and piloting wires *pl1*. It is proposed here to seek out an available routing path between two subscribers AB, AB1, and to order the connection simultaneously in the multiselectors of the two exchanges.

When a subscriber AB of exchange CN dials the number of a subscriber AB1 of the exchange CN1, the register of exchange CN (not shown in the figure) causes the seizure of scanner EXC and transmits the telephone number received to it. The scanner EXC seizes in its turn the scanner EXC1 by means of a signal sent to control circuit *cm*. It transmits to the said scanner the portion of the telephone number necessary for selection of subscriber AB1 in the exchange CN1. The scanner EXC will be oriented, then, onto first piloting wire and a search is made to find out whether there exists at least one routing path available between subscriber AB and the circuit corresponding to that first piloting wire. This search is accomplished, as in the case of diagram of FIG. 1, by dispatching piloting impulses to the subscriber's side of the selection chain and by detecting the arrival of these impulses into the scanner. In the exchange CN1, the scanner EXC1 effects a similar function by determining whether there exists at least one path available between the dialed subscriber AB1 and the circuit corresponding to the first piloting wire. In case both scanners obtain a positive result, they remain upon the position considered and the first circuit linking both exchanges is definitely chosen. Then there is determined in each exchange, one path among all that are available. This selection is done by the exchange of appropriate signals between the two scanners operating simultaneously to order the operation of electro-magnets in all the multiselectors of both central exchanges.

In case there is not any available routing path found in one of the two exchanges or in both exchanges, appropriate signals are exchanged between the two scanners. The scanners leave the position considered in order to stop on a second piloting wire and the cycle of the precedingly described operations repeats itself. The various circuits linking the two exchanges are thus scanned successively.

This process of conjugated selection is very fast. The scanners constituted as the ones shown in FIG. 1, operate rapidly. There exists fast data transmitting systems which can be used for the exchange of signals between the scanners. One of those is described in the French Patent No. 1,181,437, filed by C.G.C.T. on July 19, 1957. The conjugated selection between exchanges finds its application, namely, in the case of connections with concentrators.

*Arrangements with respect to the connection network.*—Various possibilities of realizing the connection network will now be explained by referring to FIG. 21. In order to reduce the number of crosspoints of the connection network to a minimum, which are necessary for connecting the subscribers AB1, AB2 to the junctions *jt1*, *jt2*, *jt3*, *jt4*, it is possible to adopt the following arrangements.

The subscribers can be repartitioned upon stages more or less near to the terminal where the junctions are situated. In the example shown, it has been assumed that the connection network included five selection stages: a primary stage EP, a secondary stage ES, a tertiary stage ET, a quaternary stage EQ and a terminal stage ETM. Some subscribers AB1 are connected to the banks of the terminal stage, other subscribers AB2 are connected to the banks of the quaternary stage. It may be expedient in fact to connect some high traffic subscribers to a stage more concentrated than the terminal stage.

The local junctions, or outgoing junctions, can be arranged upon the various stages of the network, instead of being connected to the last stage. In such a case, efforts will be made by means of priority devices in the markers to always choose the shortest path, among the possible ones, between the subscriber to be connected and a junction of the required group of trunks. This possibility is intersting in the case of big outgoing junction group of trunks. A large part of these junctions could then be brought nearer to the subscribers (in *jt1* for instance), and thus handle an important amount of the traffic with good results in spite of the weak accessibility. These junctions, taken in priority, operate with a high loss. The traffic which they cannot handle will be routed by the other junctions of the group of trunks, placed further on in the network (in *jt3* or *jt4* for instance). These junctions have better accessibility but use a longer path which costs more in crosspoints.

Finally, direct links can be established between two non-consecutive stages. Thus, for instance, the stage EQ has direct access means to the stages ES and EP through links such as 32 and 33. This possibility makes it possible to reach the same result as described above. The direct paths are seized before the longest paths, thus reducing the volume of the stages thus short-circuited.

Of course, the above three possibilities can be combined in several ways:

To go from the low weak traffic subscriber AB1 to a junction *jt4* of a small group of trunks, the following paths can be used with a decreasing priority:

(1) AB1, ETM, EQ, EP, *jt4*.
(2) AB1, ETM, EQ, ES, EP, *jt4*.
(3) AB1, ETM, EQ, ET, EP, *jt4*.
(4) AB1, ETM, EQ, ET, ES, EP, *jt4*.

To go from the high traffic subscriber AB2 to a junction *jt4* of a small group of trunks, the following paths can be used with a decreasing priority:

(1) AB2, EQ, EP, *jt4*.
(2) AB2, EQ, ES, EP, *jt4*.
(3) AB2, EQ, ET, EP, *jt4*.
(4) AB2, EQ, ET, ES, EP, *jt4*.

Finally, to go from subscriber AB1 to a junction of a group represented in *jt1* and *jt3* at the same time, the following paths can be used with a decreasing priority:

(1) AB1, ETM, EQ, *jt1*.
(2) AB1, ETM, EQ, ES, *jt3*.
(3) AB1, ETM, EQ, ET, ES, *jt3*.

While the principles of the invention have been described in connection with specific apparatus, it is to be clearly understood that this description is made only by way of example and not as a limitation to the scope of my invention as set forth in the object thereof and in the accompanying claims.

We claim:

1. An automatic telephone switching system comprising a plurality of subscriber stations, line circuits associated with each of said stations, connection network means comprising a plurality of paths for linking calling ones of said subscriber stations to called ones of said subscriber stations, piloting network means comprising a plurality of selected paths extending between all of said stations, each of said selected paths being analogous to one of said plurality of paths, marking means included in said piloting network means operated responsive to directive signals from said calling stations for marking said calling line circuit and said called line circuit, means for transmitting first pilot signals from said marked calling line circuit toward said marked called line circuit and for sending second pilot signals from said marked called line circuit toward said marked calling line circuit through all available ones of said selection paths, selection means for progressively blocking a part of said available selection paths through said selection network, until a single selection path is selected, and means responsive to said selection of said one selected path for switching through said connection means to link said calling station to said called station over the path analogous to said selected selection path.

2. The automatic telephone switching system of claim 1 wherein blocking means in said selection means are amplifiers and wherein said blocked amplifiers are unblocked if no signal is received at said marked calling and called line circuits.

3. The automatic telephone switching network of claim 1 wherein said connection network comprises a plurality of switching stages comprising multiselector switches, and each stage is provided with blocking means.

4. The automatic telephone switching network of claim 3 wherein said stages are multiselector switches.

5. The automatic telephone switching network of claim 4 wherein said multiselector switches comprise electromagnets for selecting crosspoints, and hold magnets having high remanence characteristics thereby reducing current consumption.

6. The automatic telephone switching network of claim 5 and means for demagnetizing said hold magnets to release said crosspoints.

7. An automatic telecommunication system for extending connections between calling and called lines through multi-path switching means comprising a plurality of serially related stages, marking means operated responsive to the receipt of said signals to transmission of directory signals from any of said calling lines, marking means operated responsive to the receipt of said signals for marking said calling and called lines, pilot means comprising a plurality of pilot paths corresponding to paths comprising the connections between calling and called lines through said multi-path switching means for transmitting pilot signals from one of said marked lines to the other of said marked lines through all available pilot paths in each of said stages, blocking means for successively blocking a decreasing number of said available pilot paths in each stage until only a single path in each stage has a pilot signal there-through, means for identifying the single path taken by said pilot signal, and means including said identifying means for operating said switching means to extend the connection over a single path corresponding to the said single pilot path in accordance with information supplied by said identifying means.

8. The automatic telecommunication system of claim 5 wherein said switching means comprises crossbar switches in each stage with select magnets and hold magnets, coils for said select magnets, and transistor circuit means for controlling the energization of said select magnet.

9. The telecommunication system of claim 6 wherein said select magnet is in the collector circuit of a power transistor whereby said magnet coil can be subjected to a high voltage time value and the current there-through is limited by emitter current, and semi-conductor means for regulating the voltage through said select magnet coils.

10. The telecommunication system of claim 5 wherein said line circuits are divided into different ranks according to class of service, electronic line scanner means for simultaneously scanning all said line circuits of the same class of service, and means including said scanner means for determining an off hook condition in any of said plurality of subscriber stations.

11. The telecommunication system of claim 7 wherein indentification wire means are provided for connecting each of said stages to said identifying means, means including said identification wire means for transmitting stage identification information to said identifying means.

References Cited by the Examiner
UNITED STATES PATENTS

| | | | |
|---|---|---|---|
| 2,170,429 | 8/1939 | Rosin | 179—18 |
| 2,252,856 | 8/1941 | Lubberger | 179—18 |
| 2,333,179 | 11/1943 | Holden | 179—18 |
| 2,883,470 | 4/1959 | Jacoby et al. | 179—18 |
| 2,925,471 | 2/1960 | Licht | 179—18 |

ROBERT H. ROSE, *Primary Examiner.*

WILLIAM C. COOPER, *Examiner.*